United States Patent
Sato et al.

(10) Patent No.: US 11,553,155 B2
(45) Date of Patent: Jan. 10, 2023

(54) COMMUNICATION CONTROLLER AND CONTROL METHOD OF COMMUNICATION CONTROLLER

(71) Applicant: SONY CORPORATION, Tokyo (JP)

(72) Inventors: Tomonori Sato, Kanagawa (JP); Makoto Noguchi, Tokyo (JP); Kazuhiko Ozawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 302 days.

(21) Appl. No.: 16/632,913

(22) PCT Filed: Jun. 13, 2018

(86) PCT No.: PCT/JP2018/022579
§ 371 (c)(1),
(2) Date: Jan. 22, 2020

(87) PCT Pub. No.: WO2019/026432
PCT Pub. Date: Feb. 7, 2019

(65) Prior Publication Data
US 2020/0169690 A1    May 28, 2020

(30) Foreign Application Priority Data

Jul. 31, 2017  (JP) .............................. JP2017-148371

(51) Int. Cl.
*H04N 5/911* (2006.01)
*G06F 3/16* (2006.01)
(Continued)

(52) U.S. Cl.
CPC ............. *H04N 5/911* (2013.01); *G06F 3/165* (2013.01); *H04M 1/72454* (2021.01);
(Continued)

(58) Field of Classification Search
CPC combination set(s) only.
See application file for complete search history.

(56) References Cited

U.S. PATENT DOCUMENTS 10,891,688 B1 *  1/2021  Clausen ................ G06F 3/0481
2005/0085271 A1 *  4/2005  Yoshino ................ H04M 11/10
(Continued)

FOREIGN PATENT DOCUMENTS

CN          105991927 A     10/2016
EP            2660712 A2    11/2013
(Continued)

OTHER PUBLICATIONS

International Search Report and Written Opinion of PCT Application No. PCT/JP2018/022579, dated Aug. 7, 2018, 08 pages of ISRWO.

(Continued)

*Primary Examiner* — Duc Nguyen
*Assistant Examiner* — Assad Mohammed
(74) *Attorney, Agent, or Firm* — Chip Law Group

(57) ABSTRACT

Reduction of recorded noise is achieved at the time of imaging in an environment of generation of noticeable noise while securing user convenience. A communication controller includes a wireless communication unit that performs first wireless communication using a first wireless communication method, and second wireless communication using a second wireless communication method, and a control unit that detects a volume of a voice, and changes a wireless output of the first wireless communication on the basis of the detected volume.

14 Claims, 9 Drawing Sheets

(51) Int. Cl.
*H04N 5/232* (2006.01)
*H04N 5/38* (2006.01)
*H04W 68/02* (2009.01)
*H04M 1/72454* (2021.01)
*H04M 1/72463* (2021.01)

(52) U.S. Cl.
CPC .... *H04M 1/72463* (2021.01); *H04N 5/23235* (2013.01); *H04N 5/38* (2013.01); *H04W 68/02* (2013.01); *H04M 2250/52* (2013.01)

(56) References Cited

U.S. PATENT DOCUMENTS

| | | | | |
|---|---|---|---|---|
| 2009/0271517 | A1* | 10/2009 | Naylor | H04L 69/28 709/227 |
| 2010/0279659 | A1* | 11/2010 | Harish | H04L 51/38 455/412.1 |
| 2011/0263233 | A1* | 10/2011 | Mikan | H04M 1/724 455/414.1 |
| 2013/0135179 | A1* | 5/2013 | Ko | H04N 21/43615 709/219 |
| 2013/0297052 | A1 | 11/2013 | Nakata et al. | |
| 2014/0028782 | A1* | 1/2014 | Kurakagi | H04N 5/23218 348/14.07 |
| 2014/0081630 | A1* | 3/2014 | Jung | H03G 3/301 704/225 |
| 2015/0269857 | A1* | 9/2015 | Feng | G09B 7/00 434/353 |
| 2015/0373761 | A1* | 12/2015 | Okamoto | H04L 67/12 455/41.2 |
| 2016/0277674 | A1 | 9/2016 | Yamada et al. | |

FOREIGN PATENT DOCUMENTS

| | | |
|---|---|---|
| JP | 2001-111883 A | 4/2001 |
| JP | 2012-165122 A | 8/2012 |
| JP | 2012-249164 A | 12/2012 |
| JP | 2013-235032 A | 11/2013 |
| JP | 2016-178622 A | 10/2016 |
| JP | 2018-037963 A | 3/2018 |
| KR | 10-2016-0112964 A | 9/2016 |

OTHER PUBLICATIONS

Office Action for JP Patent Application No. 2019-533942, dated Apr. 12, 2022, 04 pages of English Translation and 03 pages of Office Action.

* cited by examiner

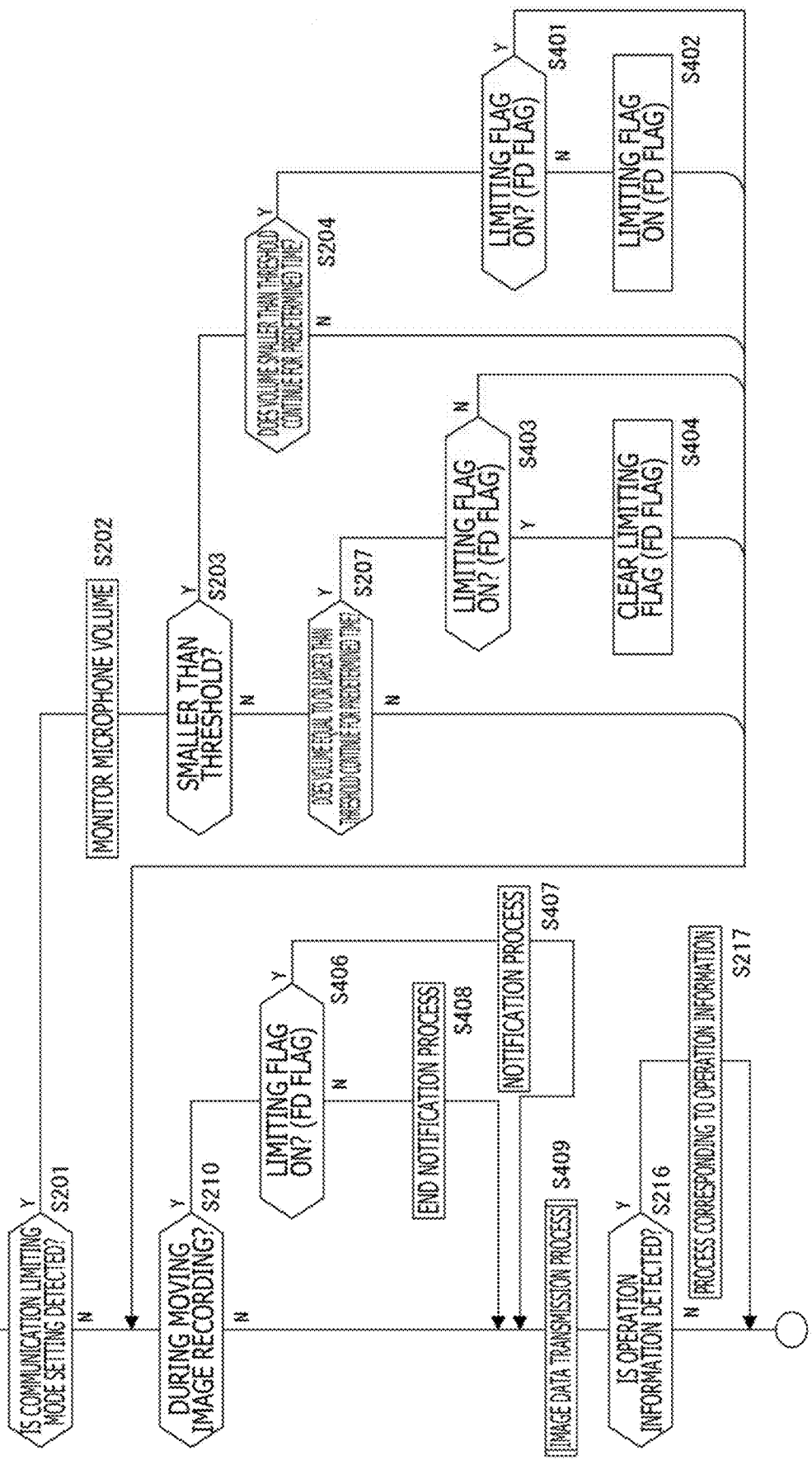

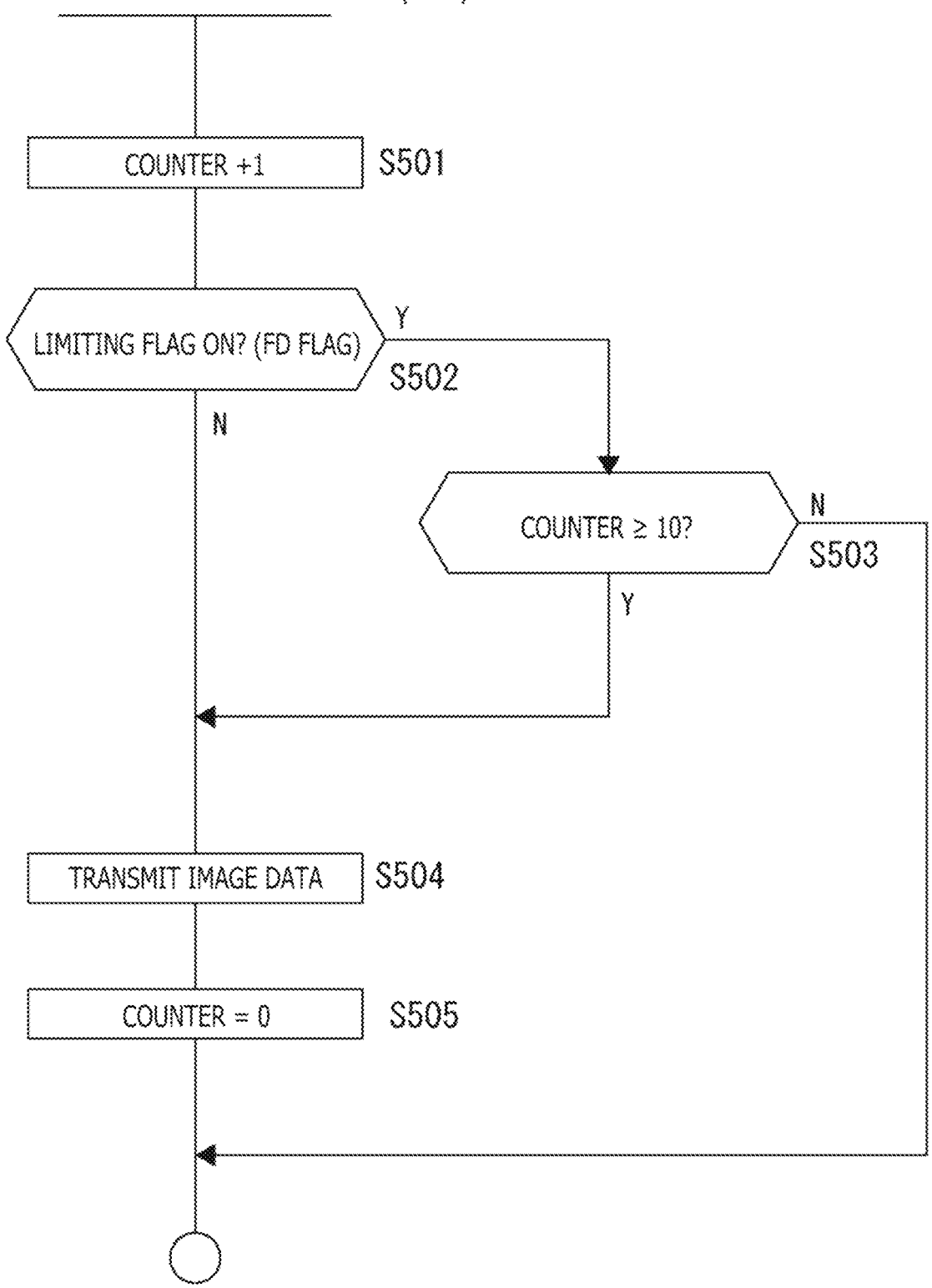

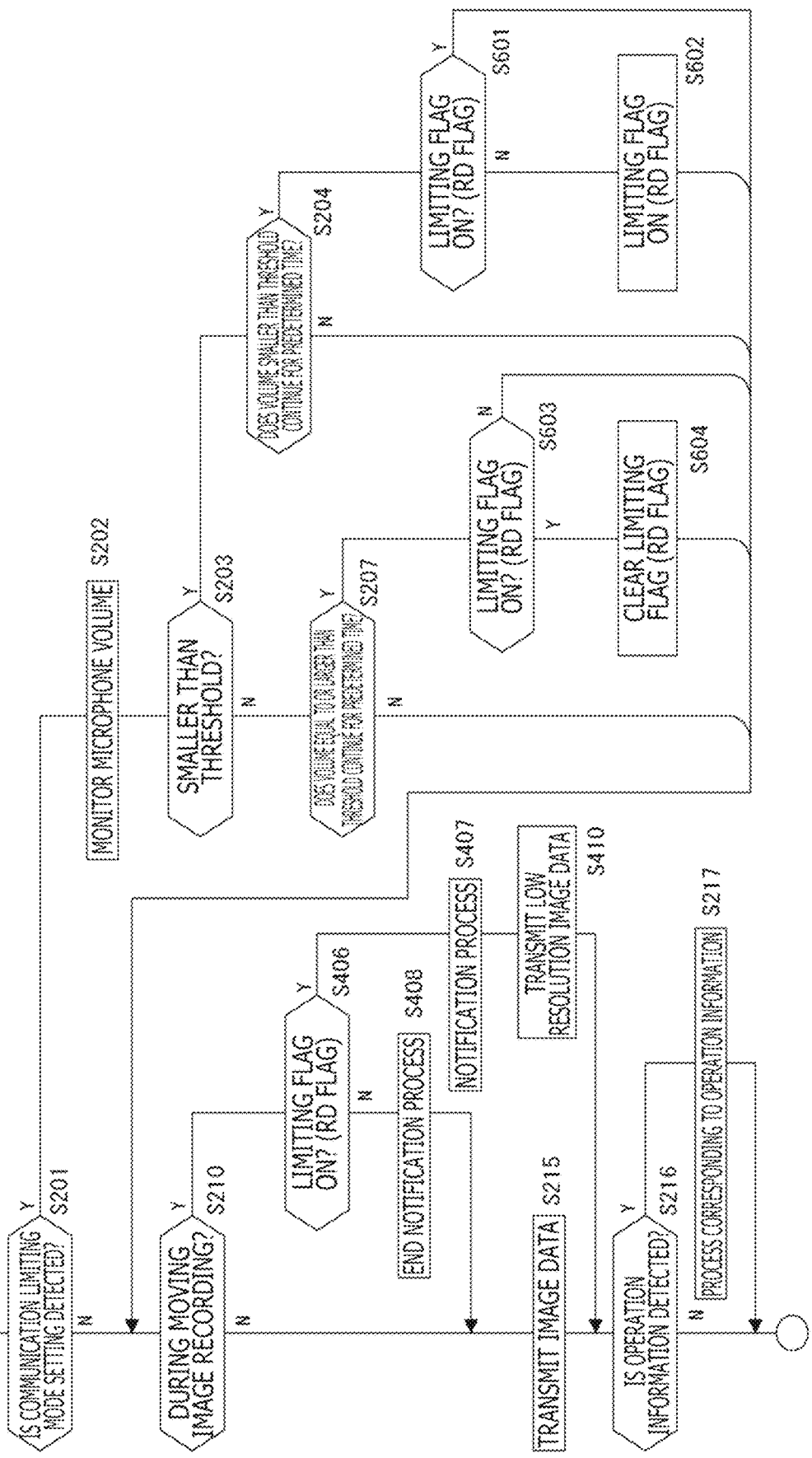

COMMUNICATION CONTROLLER AND CONTROL METHOD OF COMMUNICATION CONTROLLER

CROSS REFERENCE TO RELATED APPLICATIONS

This application is a U.S. National Phase of International Patent Application No. PCT/JP2018/022579 filed on Jun. 13, 2018, which claims priority benefit of Japanese Patent Application No. JP 2017-148371 filed in the Japan Patent Office on Jul. 31, 2017. Each of the above-referenced applications is hereby incorporated herein by reference in its entirety.

TECHNICAL FIELD

The present technology relates to a technical field of a communication controller which records at least voices, such as an imaging apparatus, and a control method of the communication controller, and a program.

BACKGROUND ART

For example, a digital camera or the like is known as an imaging apparatus which has a built-in wireless communication function. A user (image capturing person or the like) can operate a digital camera via wireless communication using another device, such as a smartphone, as a remote controller.

In a case where an image captured by the digital camera is displayed on a smartphone as a so-called live view image herein, a communication method suited for transmission and reception of image data or the like is adopted. However, when this type of communication method is used, noise may be generated by an effect of a radio wave of wireless communication during recording of captured image data. Particularly in recent years, a distance between a sound concentrating microphone and an antenna for wireless communication tends to decrease with miniaturization of imaging apparatuses. Accordingly, the foregoing effect of the radio wave has been increasing.

For example, PTL 1 and PTL 2 are given as examples of a method for reducing this noise.

CITATION LIST

Patent Literature

[PTL 1]
  JP 2001-111883A
[PTL 2]
  JP 2012-165122A

SUMMARY

Technical Problem

PTL 1 discloses an information communication controller which comes into a semi-suspension state where transmission to a home server is suspended in a stop state of an oscillation unit included in a transmission unit in response to a start of an imaging process initiated with a press of a release switch. Thereafter, at the time of completion of an imaging and recording process, the information communication controller comes into a transmissible state by returning the oscillation unit of the transmission unit to an oscillation state.

PTL 2 discloses an imaging apparatus which has three types of modes, i.e., a moving image mode, a still image mode, and a movie digest mode, and is configured to disable a communication function in response to a press of a release button in the moving image mode and the still image mode, and disable communication setting simultaneously with mode setting in the movie digest mode.

Meanwhile, a digital camera is operated by a transfer of operation information from a smartphone to the digital camera via wireless communication. However, when wireless communication between the digital camera and the smartphone is suspended in situations such as moving image recording as described in the above PTL, there is caused inconvenience such as a case where the digital camera is difficult to operate using the smartphone during moving image capturing.

Accordingly, an object of the present technology is to provide a function which reduces noise recorded during imaging while securing convenience for a user.

Solution to Problem

A communication controller according to the present technology includes: a wireless communication unit that performs first wireless communication using a first wireless communication method, and second wireless communication using a second wireless communication method; and a control unit that detects a volume of a voice, and changes a wireless output of the first wireless communication on the basis of the detected volume.

In this case, the communication controller gives the wireless output which changes in accordance with the detected ambient volume during the first wireless communication. In addition, the second wireless communication achieves wireless communication regardless of the ambient volume.

It is considered that the communication controller of the present technology described above further includes: a recording unit that records the voice concentrated by a microphone in a recording medium; and an imaging unit that images an object. The recording unit performs a process for recording image data acquired by the imaging unit in the recording medium.

In this case, the communication controller records voices concentrated by the microphone and image data in the recording medium.

According to the communication controller of the present technology described above, it is considered that the wireless communication unit transmits, via the first wireless communication, the image data acquired by the imaging unit, and receives, via the second wireless communication, operation information from an external device.

The communication controller transmits image data indicating an object imaged by the imaging unit to the external device by the wireless output changed in accordance with the detected ambient volume during recording the image data and voices concentrated by the microphone. In addition, the second wireless communication achieves wireless communication with the external device regardless of the ambient volume.

According to the communication controller of the present technology described above, it is considered that the control unit produces a state for changing the wireless output of the first wireless communication when the detected volume becomes smaller than a threshold.

A radio wave which is included in the first wireless communication and may cause noise generation during recording of captured image data and voice signals is reduced by changing the wireless output of the first wireless communication on an assumption that the ambient environment is quiet when the volume becomes smaller than the threshold.

According to the communication controller of the present technology described above, it is considered that the control unit produces a state for changing the wireless output of the first wireless communication when a period in which the detected volume becomes smaller than a threshold continues for a predetermined period or longer.

A radio wave which is included in the first wireless communication and may cause noise generation in a voice signal during recording of captured image data is reduced by changing the wireless output of the first wireless communication on an assumption that the ambient environment is quiet in a case where a state that the ambient volume is smaller than the threshold continues for the predetermined period or longer.

According to the communication controller of the present technology described above, it is considered that the control unit cancels the state for changing the wireless output of the first wireless communication when a period in which the detected volume becomes equal to or larger than a threshold continues for a predetermined period or longer.

The state for lowering the wireless output of the first wireless communication is cancelled on an assumption that the ambient situation is not quiet in a case where the period in which the ambient volume is the threshold or larger continues for the predetermined period or longer.

According to the communication controller of the present technology described above, it is considered that the control unit changes the wireless output of the first wireless communication in accordance with execution or non-execution of the first wireless communication.

A state where image data captured by an imaging apparatus 1 is not transmitted to an operation apparatus 10 is produced by interrupting transmission of image data to the operation apparatus 10 (external device) in accordance with non-execution of the first wireless communication.

According to the communication controller of the present technology described above, it is considered that the control unit changes the wireless output of the first wireless communication by lowering radio wave intensity of the first wireless communication.

Lowering of the radio wave intensity of the first wireless communication reduces a DC offset produced by an overlap of the first wireless communication on a recorded voice signal.

According to the communication controller of the present technology described above, it is considered that the control unit changes the wireless output of the first wireless communication by lowering a frame rate of image data acquired by the imaging unit.

Lowering of the frame rate of the transferred image data reduces the frequency of effects exerted by the first wireless communication on the voice signal.

According to the communication controller of the present technology described above, it is considered that the control unit changes the wireless output of the first wireless communication by lowering a resolution of image data acquired by the imaging unit.

Lowering of the resolution of the transferred image data achieves collective transfer of image data in a plurality of frames to the external device.

It is considered that the communication controller of the present technology described above includes a wireless limiting state for changing the wireless output of the first wireless communication on the basis of the detected volume is provided. The control unit shifts to the wireless limiting state when the recording unit records the concentrated voice in the recording medium.

In this case, a radio wave included in the first wireless communication and that may generate noise in the voice signal decreases during recording of the concentrated voice in the recording medium.

According to the communication controller of the present technology described above, it is considered that the control unit cancels the wireless limiting state when recording of the concentrated voice in the recording medium ends.

In this case, the state for changing the wireless output of the first wireless communication is cancelled in accordance with the ambient volume when recording of concentrated voice in the recording medium ends in a situation where noise may be recorded.

It is considered that the communication controller of the present technology described above further includes a notification unit that gives a notification that the control unit has changed the wireless output of the first wireless communication.

The communication controller gives a user a recognition that a change of a display state of the external device is produced by a change of the wireless output of the first wireless communication.

A control method of a communication controller according to the present technology includes: performing first wireless communication using a first wireless communication method, and second wireless communication using a second wireless communication method; and detecting a volume of a voice, and changing a wireless output of the first wireless communication on the basis of the detected volume.

In this case, the communication controller gives the wireless output which changes in accordance with the detected ambient volume during the first wireless communication. In addition, the second wireless communication achieves wireless communication regardless of the ambient volume.

Advantageous Effect of Invention

The present technology achieves recording with high voice quality by reducing generation of noise during data recording, thereby allowing a user to view and listen to captured image data in a comfortable manner.

Note that advantageous effects to be produced are not necessarily limited to the advantageous effects described herein, but may be any advantageous effects described in the present disclosure.

BRIEF DESCRIPTION OF DRAWINGS

FIG. 7 is a flowchart of a communication control process according to a third embodiment of the present technology.

FIG. 8 is a flowchart of an image data transmission process according to the third embodiment of the present technology.

FIG. 9 is a flowchart of a communication control process according to a fourth embodiment of the present technology.

DESCRIPTION OF EMBODIMENTS

Figure 1:
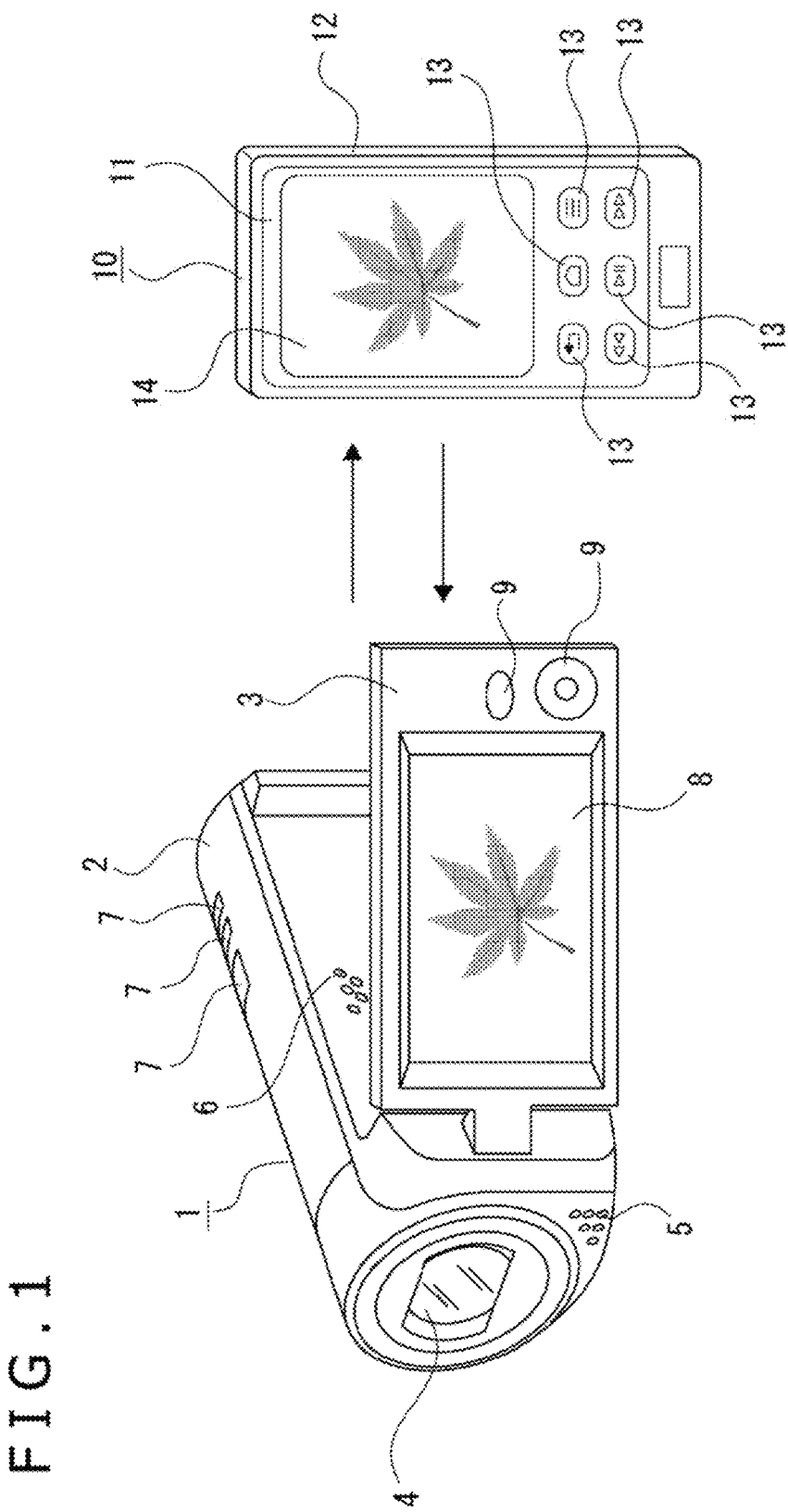
FIG. 1 is an explanatory view of configurations of an imaging apparatus and an operation apparatus according to embodiments of the present technology.

Embodiments will be hereinafter described in a following order.

<1. Outline of Imaging Apparatus>
<2. Relationship between Wireless Communication and Noise>
<3. Configuration of Imaging Apparatus>
<4. First Embodiment>
<5. Second Embodiment>
<6. Third Embodiment>
<7. Fourth Embodiment>
<8. Summary and Modified Examples>

Note that respective terms to be used are defined as follows.

A communication controller refers to an apparatus which is capable of performing wireless communication with an external device, and records at least voice data. Examples of the communication controller include a camera equipped with a remote controller function, a portable music player, and other various apparatuses. According to the present embodiments, a digital camera which is an imaging apparatus which records image data as well as voice data will be described as the communication controller.

An operation apparatus refers to an apparatus which transmits user input operation information to the communication controller to operate the communication controller in accordance with the operation information. A user is capable of remotely controlling the communication controller by operating the operation apparatus. In addition, in a case where an imaging apparatus is used as the communication controller, the operation apparatus receives image data from the imaging apparatus, and displays a so-called live view image or the like on a monitor or the like.

A first wireless communication method is a wireless communication method for transmitting image data or the like at a relatively high transfer rate. According to the present embodiments, Wi-Fi (registered trademark) is adopted as the first wireless communication method.

First wireless communication refers to wireless communication using the first wireless communication method. In the first wireless communication, image data such as a live view image having a large data amount, and recorded voice data are chiefly transferred.

A second wireless communication method is a wireless communication method for wireless communication at a lower transfer rate than that of the first wireless communication. In the present embodiments, BT (Bluetooth (registered trademark)) or BLE (Bluetooth Low Energy) is adopted as an example of the second communication method.

Second wireless communication refers to wireless communication using the second wireless communication method. In the second wireless communication, operation information input from the user via the operation apparatus is chiefly transferred.

A change of a wireless output refers to a change of an output mode of a wireless output. Examples of the change of the wireless output in the present embodiments include changes of radio wave intensity of a radio wave output, and a transmission interval in burst transmission.

A wireless imaging system using an imaging apparatus and an operation apparatus will be hereinafter described in embodiments to which the present technology has been applied.

1. Outline of Imaging Apparatus and Operation Apparatus

Configurations of an imaging apparatus 1 and an operation apparatus 10 will be described with reference to FIG. 1. FIG. 1 is an explanatory view of the configurations of the imaging apparatus 1 and the operation apparatus 10.

The imaging apparatus 1 includes an imaging device and a microphone, and is capable of recording, in a recording medium, image data based on an output from the imaging device, and voice data based on an output from the microphone. In addition, the imaging apparatus 1 has a wireless communication function, and is configured to transmit captured image data to the operation apparatus 10, and receive operation information from the operation apparatus 10.

The imaging apparatus 1 images an object in accordance with a user operation, and functions as an imaging apparatus capable of generating moving image data or still image data, or an imaging apparatus dedicated for generating moving image data, for example. According to the example depicted in FIG. 1, a video camera is adopted as the imaging apparatus 1.

As depicted in FIG. 1, the imaging apparatus 1 includes a main body 2 having a substantially cylindrical shape, and a monitor unit 3 having a substantially rectangular plate shape.

The main body 2 includes an imaging lens 4 for forming an object image, sound concentrating holes 5, a speaker 6, and a plurality of operation elements 7. In addition, the main body 2 includes a built-in antenna for performing not-depicted wireless communication.

The imaging lens 4 is provided on an end face of the main body 2 on the front side in FIG. 1. The sound concentrating holes 5 are formed at a corner with respect to the imaging lens 4. A microphone 113 described below is disposed inside the sound concentrating holes 5 to concentrate ambient voices.

The speaker 6 is provided on a side face on the side where the monitor unit 3 of the main body 2 is housed, and emits voices corresponding to recorded voice data or the like.

The plurality of operation elements 7 is provided in an upper part of the main body 2, and constituted by switches operated to input various types of operations associated with imaging, such as a moving image recording start/end button, a shutter button for imaging still images, a power supply button, and a zoom button.

The monitor unit 3 is provided in such a manner as to be pivotable in the vertical and horizontal directions with respect to the main body 2, and housed in the side face of the main body 2. The monitor unit 3 includes an LCD (Liquid Crystal Display) monitor 8, and a plurality of operation elements 9.

The LCD monitor 8 has a substantially rectangular shape, and displays a captured image in real time on the basis of image data. In addition, a captured image based on recorded image data is allowed to be displayed on the LCD monitor 8.

The plurality of operation elements 9 is provided at an end portion of the monitor unit 3, and constituted by switches operated to input various types of operations associated with imaging, such as a menu button, a mode setting button, a decision button, and a cross-shaped button provided in four directions, i.e., upper, lower, left, and right directions. For example, the mode setting button is operated to set a wireless communication limiting mode described below. In this mode, a state of controlling wireless communication can be produced to reduce noise generated during silent imaging.

Note that functions of the operation elements 7 and the operation elements 9 are not limited to the respective functions described herein as long as the operation elements 7 and 9 are switches operated to input various operations. The operation elements 7 may have the functions of the operation elements 9, and the operation elements 9 may have the functions of the operation elements 7.

The operation apparatus 10 transmits operation information input by the user to the imaging apparatus 1 to operate the imaging apparatus 1. While the imaging apparatus 1 is observing an object, the operation apparatus 10 displays a captured image in a monitor area 14 in real time on the basis of image data received from the imaging apparatus 1.

For example, the operation apparatus 10 is a PC (Personal Computer), a future phone, or a PDA (Personal Digital Assistant) having a wireless communication function and a display, or is a smart device such as a smartphone and a tablet terminal, a portable music player, a watch type information device or others. The operation apparatus 10 is constituted by a smartphone in FIG. 1 as an example.

The user is capable of achieving various operations by performing a touch operation on a display surface, a crown operation in a case of a watch type, and other operations.

In addition, the watch type information device has a monitor area in a portion corresponding to a time display screen, and is capable of displaying through images (object monitoring images) in this monitor area as moving images corresponding to captured image data received from the imaging apparatus 1.

Note that the operation apparatus 10 may be a remote controller or the like on which a display is mounted, as a controller dedicated for the imaging apparatus 1. The function of the operation apparatus 10 may be implemented by any device as long as the device has a wireless communication function.

In the example depicted in FIG. 1, the operation apparatus 10 is constituted by a smartphone, and includes an operation main body 12 having a substantially rectangular plate shape and including an LCD panel 11. For example, the operation apparatus 10 functions as a remote controller for the imaging apparatus 1 under an application installed to perform a remote controller function.

An operation area 13 and a monitor area 14 are displayed on a liquid crystal screen included in the LCD panel 11 of the smartphone.

The operation area 13 can function as an operation element. The user performs a touch operation or the like on the LCD panel 11 to achieve an input operation.

A live view image captured by the imaging apparatus 1 or other images are displayed in the monitor area 14. The user is allowed to operate the operation area 13 while viewing the captured image.

In addition, the operation apparatus 10 includes a not-depicted built-in antenna for performing wireless communication.

With miniaturization of the imaging apparatus 1, this not-depicted antenna for wireless communication is disposed in the vicinity of the microphone 113 inside the imaging apparatus 1 in the example of the imaging apparatus 1 depicted in FIG. 1. Accordingly, while the imaging apparatus 1 is recording voice data concentrated by the microphone 113, radio wave noise of the output first wireless communication may be mixed into voice signals during recording, and recorded as noise.

The user designates the operation apparatus 10 as a remote controller by operating the operation elements 7 or the operation elements 9 of the imaging apparatus 1 for setting through a menu screen or the like. According to the example depicted in FIG. 1, a smartphone is designated as the operation apparatus 10.

The operation apparatus 10 communicates with the imaging apparatus 1 in a state of an application start to establish this setting. In this manner, wireless communication between the imaging apparatus 1 and the operation apparatus 10 is achievable.

The user located at a position away from the imaging apparatus 1 can operate the imaging apparatus 1 by operating the operation area 13 of the operation apparatus 10.

Accordingly, the operation apparatus 10 is capable of causing the imaging apparatus 1 to perform various controls, such as start or end control of moving image recording, shutter control for still image recording, zoom control, exposure time and diaphragm controls, and flash light emission control.

2. Relationship Between Wireless Communication and Noise

Figure 2:
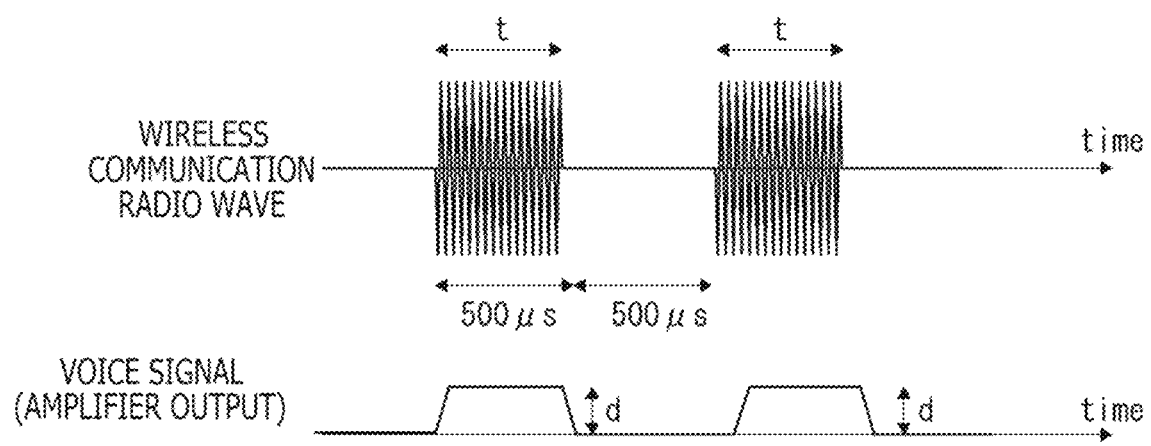
FIG. 2 is an explanatory diagram of noise generated during recording according to the embodiments of the present technology.

Noise recorded during moving image recording by the imaging apparatus 1 will be next described with reference to FIG. 2. FIG. 2 depicts a relationship between a radio wave generated during transmission of image data or the like from the imaging apparatus 1, and a recorded voice signal.

During wireless communication between the imaging apparatus 1 and the operation apparatus 10, not only operation information is transmitted from the operation apparatus 10 to the imaging apparatus 1, but also image data or the like having a large data amount is transmitted from the imaging apparatus 1 to the operation apparatus 10. Accordingly, high transfer rate Wi-Fi is adopted as the wireless communication method, for example.

In the wireless communication using Wi-Fi, a radio wave is chiefly output during transmission of data such as image data. In FIG. 2, a period in which this radio wave is output is indicated by a radio wave output period t.

Meanwhile, wireless communication between the imaging apparatus 1 and the operation apparatus 10 is not performed in a period other than the radio wave output period t. This period is used for wireless communication of other electronic devices.

DC offsets d depicted in FIG. 2 are produced in a voice signal by the output Wi-Fi radio wave. In this case, noise is generated in the voice signal, and may be recorded as noise during moving image recording.

There exist two types of Wi-Fi frequencies herein, i.e., 2.4 GHz band and 5 GHz band. These frequencies are extremely higher than a human audible range. Accordingly, in general, these frequencies are not heard by human ears even when overlapped on voice signals without change.

Burst transfer is executed during communication of a large amount of data in Wi-Fi. At the time of this burst transfer, a Wi-Fi radio wave overlapped with voice signals produces the DC offsets d in amplifier output. In this case, noise is recorded during moving image recording.

Particularly when a data transmission interval becomes a frequency easily heard by humans, such as 1 KHz (cycle=1 ms=500 μm+500 μm) as depicted in FIG. 2, this noise is recorded as offensive noise for the user.

This noise does not become considerably noticeable in such a time period in which a certain high level of ambient voices are generated in moving image capturing. However, this noise becomes extremely noticeable in a quiet time period which may be produced during presentation of a school art festival, during class on a school open day, or other occasions, for example.

The Wi-Fi wireless communication function of the imaging apparatus 1 may cause noise generation, wherefore interruption of this function during moving image recording is considered herein. However, this wireless communication performs not only transmission of image data, but also reception of operation information from the operation apparatus 10. Accordingly, operation of the imaging apparatus 1 using the operation apparatus 10 becomes difficult when this wireless communication is interrupted.

The present technology therefore adopts two wireless communication methods, that is, a first wireless communication method for transfer of image data or the like having a large data amount, and a second wireless communication method for transfer of operation information associated with the operation apparatus 10 as a method not easily generating noise during moving image recording.

In an example described in the present embodiments, high transfer rate Wi-Fi is employed as the first wireless communication method, while BT or BLT not easily affecting noise during moving image recording is employed as the second wireless communication method.

In this manner, first wireless communication using the first wireless communication method can be limited in a quiet time period during moving image recording, while maintaining a transmittable state of operation information from the operation apparatus 10 to the imaging apparatus 1 via second wireless communication using the second communication method. In other words, noise reduction is achievable in a silent time of recorded moving images while securing an operable state of the imaging apparatus 1 using the operation apparatus 10 of the user.

Various methods are considered as a method for reducing noise during a silent time, such as interruption of the first wireless communication, lowering of radio wave intensity of the first wireless communication, and lowering of a frame rate or a resolution of image data transmitted to the operation apparatus 10. Details of this method will be described below.

3. Configuration of Imaging Apparatus

Figure 3:
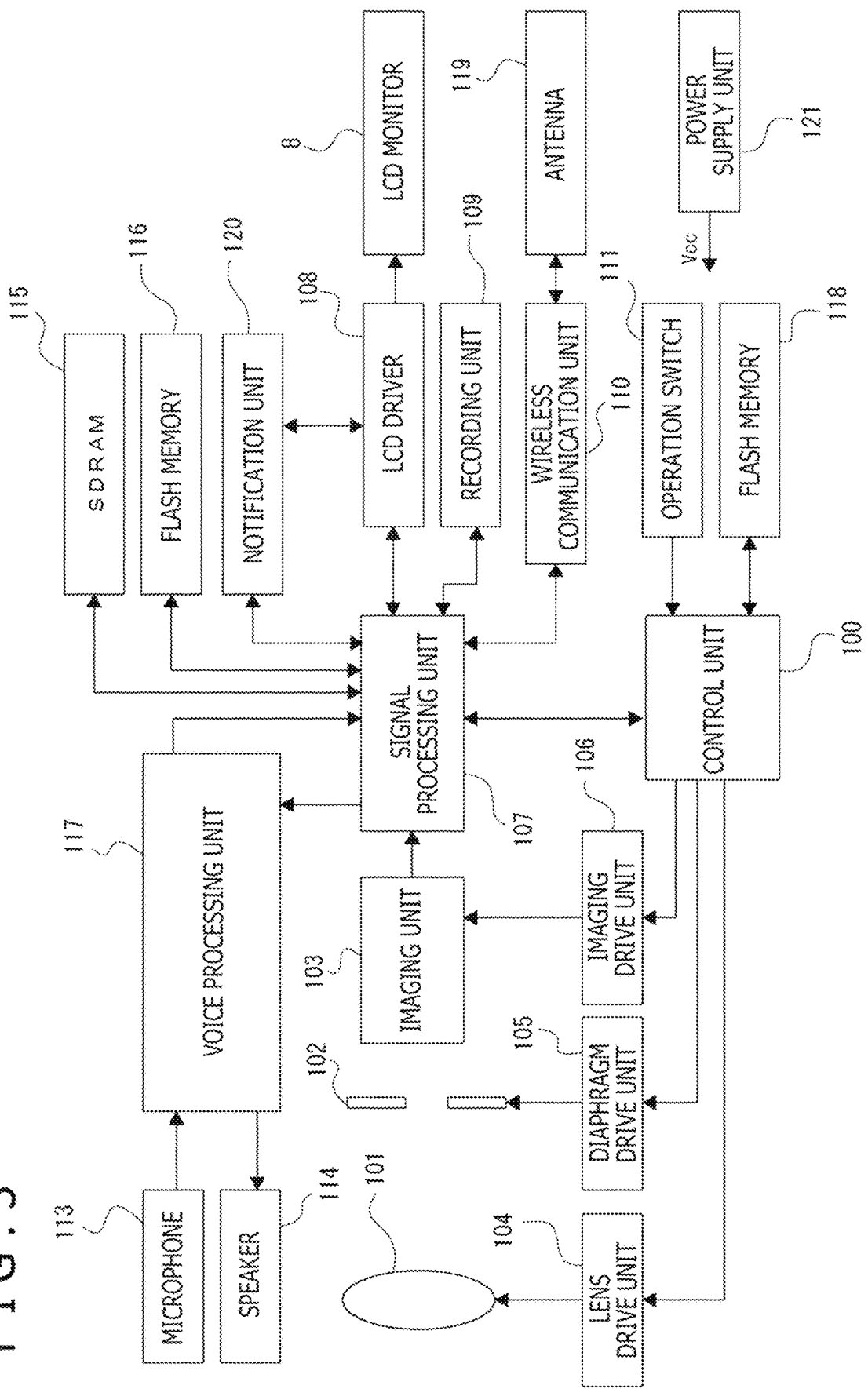
FIG. 3 is an explanatory diagram depicting a function configuration of the imaging apparatus according to the embodiments of the present technology.

An internal configuration of the imaging apparatus 1 will be described with reference to FIG. 3. FIG. 3 is a block diagram depicting a function of the imaging apparatus 1 according to the embodiments.

The imaging apparatus 1 outputs display of image data obtained by an imaging operation, outputs and stores the image data in a storage medium, and outputs transmission of the image data to an external device. It is assumed that the image data to be output is stream data in a so-called predetermined image format, data in a file format, RAW image data or the like.

The imaging apparatus 1 includes a control unit 100, an imaging lens 101, a diaphragm mechanism 102, an imaging unit 103, a lens drive unit 104, a diaphragm drive unit 105, an imaging drive unit 106, a signal processing unit 107, an LCD driver 108, a recording unit 109, a wireless communication unit 110, an operation switch 111, an LCD monitor 8, a microphone 113, a speaker 114, an SDRAM 115, a flash memory 116, a voice processing unit 117, a flash memory 118, an antenna 119, a notification unit 120, and a power supply unit 121.

The imaging lens 101 is provided as a lens system receiving object light. While the imaging lens 101 is depicted as a single lens in FIG. 3, the imaging lens 101 is actually constituted by a plurality of lenses such as a condensing lens, a focus lens, and a zoom lens.

Light entering via the imaging lens 101 passes through the diaphragm mechanism 102, and reaches the imaging unit 103 to be received. In other words, an image is formed on an imaging device of the imaging unit 103.

The lens drive unit 104 is presented as a mechanism for driving the focus lens and the zoom lens of the imaging lens 101 in an optical axis direction. The lens drive unit 104 communicates with the control unit 100 to control focus driving, zoom driving and the like of the imaging lens 101 by the lens drive unit 104 in accordance with an instruction from the control unit 100.

The diaphragm drive unit 105 drives the diaphragm mechanism 102 to regulate luminous flux entering the imaging lens 101 by changing an opening of the diaphragm mechanism 102. The diaphragm drive unit 105 communicates with the control unit 100 to control driving by the diaphragm drive unit 105 in accordance with an instruction from the control unit 100, and achieve diaphragm control in accordance with object luminance during imaging.

For example, the imaging unit 103 includes an imaging device constituted by a CMOS (Complementary Metal Oxide Semiconductor) sensor or the like, and a read-out signal circuit for processing a signal read out from the imaging device, and other components.

The imaging unit 103 executes a CDS (Correlated Double Sampling) process, an AGC (Automatic Gain Control) process and the like in the read-out signal circuit for an electric signal obtained by photoelectric conversion by the imaging device, and further performs an A/D (Analog/Digital) conversion process. Thereafter, the imaging unit 103 outputs an imaging signal as digital data to the signal processing unit 107 in a following stage.

Charge accumulation and signal read out are performed by the imaging device of the imaging unit 103 on the basis of a timing signal received from the imaging drive unit 106. An electronic shutter operation is performed by the imaging unit 103 under control by the imaging drive unit 106.

For example, the signal processing unit 107 is constituted by a DSP (Digital Signal Processor) or the like. The signal processing unit 107 performs various signal processing for a digital signal (imaging signal) received from the imaging unit 103.

For example, the signal processing unit 107 performs picture processing such as white balancing and gamma processing, image quality correction processing such as inter-frame noise reduction, resolution conversion processing, display signal generation processing, and recording/ communication encoding processing (codec), and outputs image data (moving images or still images). The signal processing unit 107 further performs processing such as addition of metadata to image data.

Image data as a display signal is supplied to the LCD driver 108. Image data for recording is supplied to the recording unit 109. Image data for communication is supplied to the wireless communication unit 110.

In addition, the signal processing unit 107 generates a display screen on the basis of an instruction from the control unit 100, and causes the LCD driver 108 to display the display screen on the LCD monitor 8.

Furthermore, the signal processing unit 107 processes a voice signal received from the microphone 113 and records the processed voice signal in the recording unit 109, and also processes voice data recorded in the recording unit 109 and outputs the processed voice data to the speaker 114.

For performing the various signal processing described above, the signal processing unit 107 temporarily stores data in the SDRAM 115. The flash memory 116 stores a program under which the signal processing unit 107 executes the various processing.

The microphone 113 concentrates ambient voices (sounds from object and environmental sounds) during moving image capturing. According to the present embodiments, the microphone 113 built in the imaging apparatus 1 is presented by way of example. However, the microphone 113 which is detachably attached may be employed as an external microphone.

A voice signal concentrated by the microphone 113 is subjected to amplification, A/D conversion, equalizing and other processing at the voice processing unit 117, and input to the signal processing unit 107 as voice data corresponding to moving image data. During moving image capturing, the signal processing unit 107 processes the voice data supplied from the voice processing unit 117 as voice data associated with pictures of moving images.

The speaker 114 outputs a recorded voice signal at the time of reproduction. The voice processing unit 107 amplifies voice data recorded in the recording unit 109 and obtained by D/A conversion, and outputs the amplified voice data to the speaker 114.

The control unit 100 is constituted by a microcomputer (arithmetic processing unit) which includes a CPU (Central Processing Unit), a ROM (Read Only Memory), a RAM (Random Access Memory), a flash memory, and others.

An overall operation of the imaging apparatus 1 is integratedly controlled under programs stored in the ROM, the flash memory and the like and executed by the CPU.

The RAM is used for temporarily retaining data, programs and the like, as a work area during various data processing performed by the CPU.

The ROM and the flash memory (non-volatile memory) are used for storing an OS (Operating System) on which the CPU controls respective components, and a content file such as an image file, and also used for storing application programs for various operations, firmware and the like. For example, the ROM and the flash memory store a program for executing a shutter mode setting process described below in the present embodiment.

The control unit 100 thus configured controls operations of respective components, such as the lens drive unit 104, the diaphragm drive unit 105, and the imaging drive unit 106, necessary for performing instructions of various signal processing performed by the signal processing unit 107, transmission of a state of the operation switch 111 corresponding to a user operation to the signal processing unit 107, a reproduction operation of a recorded image file, a shutter mode operation, a camera operation such as zoom, focus, and exposure adjustment, a user interface operation and the like.

The flash memory 118 stores programs under which the control unit 100 executes various processing.

The LCD monitor 8 is a display unit where various types of display are presented to the user, and includes a display device such as an LCD and an organic EL (Electro-Luminescence) display provided on a housing of the imaging apparatus 1, for example.

Note that the LCD monitor 8 may be constituted by an LCD, an organic EL display or the like in a mode of a so-called view finder.

The LCD driver 108 controls a display operation on the LCD monitor 8. For example, the LCD driver 108 executes various types of display on the LCD monitor 8 on the basis of an instruction from the control unit 100. For example, the LCD driver 108 displays, on the LCD monitor 8, reproduction of still images and moving images captured and recorded in a recording medium (recording unit 109 described below), and displays through images (object monitoring images) as moving images based on captured image data in respective frames captured during waiting for a shutter operation (release operation) or standby of moving image capturing. The LCD driver 108 further executes display of various operation menus, icons, messages and the like, i.e., display as GUI (Graphical User Interface) on a screen of the LCD monitor 8.

The operation switch 111 has an input function for receiving an input of a user operation, and transmits a signal corresponding to the input operation to the control unit 100.

For example, the operation switch 111 is implemented by various operation elements provided on the housing of the imaging apparatus 1, a touch panel formed on the LCD monitor 8, or others.

The operation elements on the housing include a menu button, a decision button, a cross-shaped button, a cancel button, a zoom button, a slide button, a shutter button (release button), and others.

In addition, various operations may be achievable in accordance with a touch panel operation using icons, menus or the like displayed on the touch panel and the LCD monitor 8.

In FIG. 1, the operation switch 111 is presented as the operation elements 8 and the operation elements 9, for example.

The recording unit 109 is constituted by a non-volatile memory, for example, and functions as a storage area for storing image data generated by the signal processing unit 107 (image data files (content files) of still images and moving images), voice data, metadata associated with image data files and voice data files, thumbnail images and the like.

Various modes are considered as actual modes of the recording unit 109. For example, the recording unit 109 may be a flash memory built in the imaging apparatus 1, or a mode constituted by a memory card detachably attached to the imaging apparatus 1 (e.g., portable flash memory) and a card recording and reproduction unit performing a recording and reproduction access to the memory card. In addition, the mode of the recording unit 109 built in the imaging apparatus 1 is implemented as an HDD (Hard Disk Drive) or the like in some cases.

The wireless communication unit 110 wirelessly performs data communication with an external device. For example, the wireless communication unit 110 converts image data (e.g., image data files as still images and moving images, or moving image stream data) into wireless signals, and transmits the wireless signals to the external device such as a display device, a communication controller, a reproduction device, and an edition device via the antenna 119. According to the present embodiment, the operation apparatus 10 is designated as the external device. The operation apparatus 10 displays a captured image in the monitor area 14 depicted in FIG. 1 in real time on the basis of image data received from the imaging apparatus 1.

In addition, the wireless communication unit 110 receives operation information associated with the operation elements 13 of the operation apparatus 10 depicted in FIG. 1 via the antenna 119, and transmits the operation information to the signal processing unit 107.

Various wireless communication methods are adoptable for wireless communication with the external device. According to the present embodiment, two types of wireless communication methods are adopted by way of example. High transfer rate Wi-Fi is adopted as the first wireless communication method, while BT or BLT not easily affecting noise during moving image recording is adopted as the second wireless communication method.

Note that the wireless communication unit 110 as a network communication unit is also capable of performing communication via various types of networks such as the Internet, a home network, a LAN (Local Area Network), and achieving various types of data transmission and reception with a server, a terminal and the like on the networks.

In addition, while not depicted in the figure, a wired communication unit performing wired data communication with the external device may be provided.

The notification unit 120 receives, from the control unit 100 via the signal processing unit 107, a state that the first wireless communication by the first wireless communication method is limited, and notifies the LCD driver 108 of this state. The LCD driver 108 displays this state on the LCD monitor 8.

The power supply unit 121 supplies operation power source voltage Vcc to respective units. The power supply unit 121 uses a loaded battery (primary battery or secondary battery) as a power supply. In addition, the power supply unit 121 is also capable of obtaining the operation power source voltage Vcc using an external commercial alternating current power supply connected via a not-depicted AC adapter.

The control unit 100 performs power supply on-off control for the power supply unit 121. In addition, the control unit 100 is capable of detecting whether or not the power supply unit 121 is using the commercial alternating current power supply via the AC adapter, and also capable of detecting a battery residual quantity during use of the battery.

4. First Embodiment

An imaging apparatus control process (S100) and a communication control process (S107) according to a first embodiment will be described with reference to FIGS. 4 and 5.

According to the first embodiment, a wireless output is changed by interrupting the first wireless communication in a case where a state that an ambient volume becomes smaller than a threshold continues for a predetermined time in a wireless limiting mode. This change of the wireless output produces such a state where image data captured by the imaging apparatus 1 is not transmitted to the operation apparatus 10. Accordingly, noise generated by a radio wave of the first wireless communication is eliminated from a voice signal, wherefore reduction of noise, which is recorded during moving image recording and noticeable and offensive to ears in a quiet time with a small ambient volume, is achievable.

Initially, the imaging apparatus control process (S100) performed by the control unit 100 of the imaging apparatus 1 will be described with reference to FIG. 4.

In step S101, the control unit 100 monitors whether or not use setting of the operation apparatus 10 has been established by a user operation.

The use setting refers to setting for enabling the control unit 100 to use the operation apparatus 10 as a remote control apparatus for the imaging apparatus 1 in a case where the user performs an operation which requests use of the operation apparatus 10 for operation of the imaging apparatus 1.

In a period in which the use setting of the operation apparatus 10 is not established, the control unit 100 executes a process corresponding to a key operation by the user in step S102.

In a case where the use setting of the operation apparatus is established, the control unit 100 advances the process from step S101 to step S103 and establishes initial settings of wireless communication.

The establishment of the initial settings by the control unit 100 produces a state for achieving the first wireless communication using the first wireless communication method and the second wireless communication using the second wireless communication method between the imaging apparatus 1 and the operation apparatus 10.

Thereafter, the control unit 100 transmits a connection request for connecting with the first wireless communication and the second wireless communication to the operation apparatus 10 in step S104. The control unit 100 receives a response from the operation apparatus 10 in step S105, and thus establishes a communication state between the imaging apparatus 1 and the operation apparatus 10 in step S106. The imaging apparatus 1 allows the operation apparatus 10 to function as a remote controller by establishment of a state of wireless communication with the operation apparatus 10.

In this manner, the control unit 100 is allowed to receive operation information input by the operation apparatus 10, and control the imaging apparatus 1 on the basis of the received operation information. In other words, the user is capable of operating the imaging apparatus 1 located at a position away from the user by operating the operation apparatus 10.

Moreover, the control unit 100 is capable of transmitting captured image data to the operation apparatus 10 via the wireless communication unit 110. The image data received by the operation apparatus 10 is displayed in the monitor area 14. Accordingly, the user is allowed to operate the operation elements 13 while viewing the captured image.

In the state of establishment of communication between the imaging apparatus 1 and the operation apparatus 10, the control unit 100 performs the communication control process for controlling the first wireless communication in step S107. Details of the communication control process will be described below.

The control unit 100 continues the communication control process in step S107 until reception of a communication disconnection request in step S108.

At the time of reception of the communication disconnection request in step S108, the control unit 100 advances the process to step S109 and performs a communication disconnection process for disconnecting the first wireless communication and the second wireless communication. Thereafter, the control unit 100 performs a process for turning off the operation of the wireless communication unit in step S110. As a result, the communicable state between the imaging apparatus 1 and the operation apparatus 10 is cancelled. In other words, the user is unable to operate the imaging apparatus 1 using the operation apparatus 10.

After completion of processing in step S110, the control unit 100 advances the process to step S101 and performs following similar processing.

Figure 4:
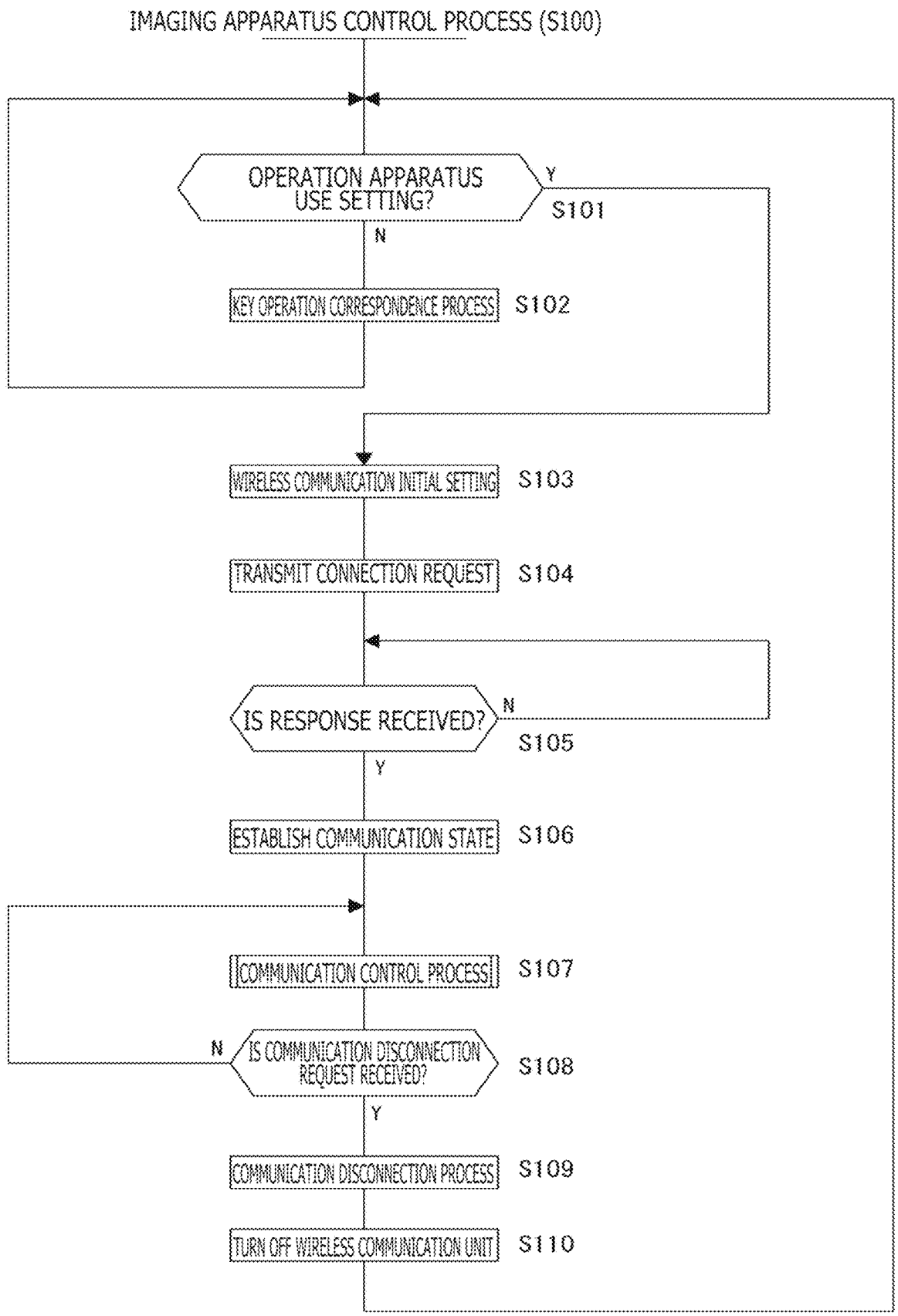
FIG. 4 is a flowchart of an imaging apparatus control process according to the embodiments of the present technology.

Note that the imaging apparatus control process depicted in FIG. 4 is executed in a similar manner in second to fourth embodiments described below, but not repeatedly described herein.

The communication control process performed by the control unit 100 in step S107 in FIG. 4 will be described with reference to FIG. 5. For example, the control unit 100 executes the process in FIG. 5 at one frame intervals of a captured image.

In a state of establishment of the first wireless communication and the second wireless communication between the imaging apparatus 1 and the operation apparatus 10, the control unit 100 detects whether or not a state of a communication limiting mode has been set in step S201. The communication limiting mode is an operation mode for changing a wireless output in accordance with an ambient voice situation. This communication limiting mode is selected by a user operation through the imaging apparatus 1 or the operation apparatus 10.

In a case where the communication limiting mode is not set, the control unit 100 branches the process in accordance with whether or not the current state is a moving image recording state in step S210.

When the current state is not the moving image recording state, the control unit 100 transmits image data in the frame currently captured by the imaging apparatus 1 to the operation apparatus 10 via the first wireless communication in step S215.

As a result, a captured image obtained by the imaging apparatus 1 is displayed on the operation apparatus 10. More specifically, in this case, a captured image in a state before a recording start (standby state) is displayed. Accordingly, during this period, the user selects an object, or waits until moving image recording start timing while checking an object.

In addition, the control unit 100 receives operation information from the operation apparatus 10 via the second wireless communication in step S216, and executes processing corresponding to respective operations in step S217. The user is capable of controlling various operations of the imaging apparatus 1 by operating the operation apparatus 10 while checking the captured image displayed in the monitor area 14 in FIG. 1.

After processing in step S217 or in a case where the operation information is not detected in step S216, the control unit 100 advances the process to step S108 in FIG. 4, and repeats the communication control process in step S107 until reception of a communication disconnection request.

In a case where the current state is a state during moving image recording in step S210, the process advances to step S212. In addition, in a case where the current mode is not the communication limiting mode, the limiting flag is not turned on, and a notification process in step S214 is not performed. Accordingly, an image captured by the imaging apparatus 1 (so-called through image) is displayed on the operation apparatus 10 in a similar manner in step S215. In this manner, the user is capable of checking a captured image screen during moving image recording in the monitor area 14 of the operation apparatus 10. Thereafter, the control unit 100 performs processing in steps S216 and S217 in a similar manner.

When a state where the communication limiting mode has been set is detected in step S201, the control unit 100 advances the process to step S202, and performs a monitoring process for monitoring a volume level of an input voice signal from the microphone 113. In other words, the control unit 100 acquires information associated with an input volume from the signal processing unit 107, and monitors a transition of values of the ambient volume on the basis of the acquired information.

Thereafter, the control unit 100 determines whether or not the value of the ambient volume has become smaller than a threshold in step S203. The threshold is a set value of an ambient volume at which noise is recognizable for the user during reproduction of recorded moving images.

In a case where the value of the ambient volume becomes smaller than the threshold, the control unit 100 determines whether or not the state that the ambient volume is smaller than the threshold has continued for a predetermined time in step S204. The predetermined time is a time length set beforehand, such as two seconds or three seconds. Needless to say, these time lengths are presented only by way of example. The predetermined time may be a longer time such as five seconds or six seconds, or two seconds or shorter such as ten frames and one second. In addition, the predetermined time may be set to zero seconds, and continuation of the state of the volume smaller than the threshold for the predetermined time may be determined at a moment when the value of the volume becomes smaller than the threshold.

When it is determined that the state of the volume smaller than the threshold does not continue for the predetermined time in step S204, the control unit 100 determines whether or not the current state of the imaging apparatus 1 is the state during moving image recording in step S210. In a case where the current state is the state during moving image recording, the control unit 100 advances the process to step S215 via steps S212 and S214. In other words, at a time when a quiet ambient situation is not considered to continue even in a quiet state, the process advances to step S210 without turning on the limiting flag (interruption flag).

In this manner, the control unit 100 advances the process to steps S210, S212, S214, and S215 in this order, and performs control for transmitting image data in the current frame to the operation apparatus 10 even during moving image recording. Accordingly, the image captured by the imaging apparatus 1 is displayed on the operation apparatus 10, wherefore the user is allowed to check the captured image screen during moving image recording on the monitor area 14 of the operation apparatus 10.

Thereafter, the control unit 100 performs the processing in steps S216 and S217 in a similar manner.

In a case where the state of the volume smaller than the threshold is determined to have continued for the predetermined time in steps S203 and S204, the control unit 100 determines whether or not the limiting flag (interruption flag) is in the on-state in step S205.

The interruption flag is a flag which indicates a period in which the first wireless communication between the imaging apparatus 1 and the operation apparatus 10 should be limited, i.e., a period in which a state of a change of a wireless output in the first wireless communication should be produced. The state of the change of the wireless output refers to a state of interruption of the first wireless communication according to the first embodiment.

In a case where the interruption flag is not in the on-state, the control unit 100 brings the interruption flag into the on-state in step S206. In other words, the control unit 100 brings the interruption flag into the on-state in response to an elapse of the predetermined time in the quiet state.

Thereafter, the control unit 100 advances the process from step S206 to step S210. In a case of a state during moving image recording, the control unit 100 checks the interruption flag in step S212, and advances the process to step S213 when the interruption flag is in the on-state.

In step S213, the control unit 100 performs the notification process for notifying, via the second wireless communication, the operation apparatus 10 of the state that the first wireless communication has been interrupted. The notification process is achieved by displaying the notification in the monitor area 14 or the like of the operation apparatus 10, for example. Note that the method of the notification may be any methods as well as the display in the monitor area 14 of the like, such as notification by sounds, as long as the user can recognize interruption of the first wireless communication.

Thereafter, the control unit 100 performs the processing in steps S216 and S217 in a similar manner without performing step S215. More specifically, the control unit 100 does not perform the transmission control in step S215 (control of transmission of image data in the current frame to the operation apparatus 10 via the first wireless communication), wherefore the image captured by the imaging apparatus 1 is not displayed on the operation apparatus 10.

As a result, communication via the first wireless communication between the imaging apparatus 1 and the operation apparatus 10 is interrupted. The interruption of the first wireless communication can prevent noise generated by effects of the first wireless communication during recording of voice signals.

Note that the second wireless communication is not interrupted even in the on-state of the interruption flag. Accordingly, the imaging apparatus 1 is capable of receiving input operation information from the operation apparatus 10 via the second wireless communication even in the interrupted state of the first wireless communication.

In addition, during interruption of the first wireless communication, it is preferable that an output of a radio wave from the antenna 119 of the imaging apparatus 1 is prevented by complete disconnection of communication. In this case, however, a time may be required until establishment of communication between the imaging apparatus 1 and the operation apparatus 10 at the time of a restart of the first wireless communication. Accordingly, only transfer of image data or the like is interrupted at the time of interruption of the first wireless communication. In this manner, responsiveness to the restart of the first wireless communication improves together with considerable improvement in overlapping of the first wireless communication on the microphone 113 by reduction of the transfer data amount.

In a case where the interruption flag is in the on-state in step S205, the control unit 100 advances the process from the step S205 to the step S210. When the current state is the state during moving image recording, it is checked that the interruption flag is in the on-state in step S212. Thereafter, processing in steps S213, S216, and S217 is performed in a similar manner.

In other words, it is determined that the quiet ambient state is still continuing in the communication limiting mode, and the state of interruption of the communication between the imaging apparatus 1 and the operation apparatus 10 via the first wireless communication is maintained. Accordingly, the image captured by the imaging apparatus 1 is not displayed on the operation apparatus 10.

Note that the control unit 100 advances the process from step S210 to step S215 in this order even in the on-state of the interruption flag when the current state is not the state of moving image recording. Accordingly, the operation apparatus 10 executes through image display. This display is executed for a following reason. When the current state is not the state during moving image recording, noise is not recorded. Accordingly, interruption of the first wireless communication (changing the wireless output) is not highly required. In addition, the user is therefore allowed to monitor through images on the operation apparatus 10 regardless of the ambient voice situation before the start of moving image recording even in the communication limiting mode, and execute selection of an object or determination of moving image recording start timing, for example. Accordingly, usability does not deteriorate.

In a case where the ambient volume value becomes the threshold or larger in step S203 during moving image recording in the on-state of the interruption flag, the control unit 100 determines whether or not the state that the ambient volume is the threshold or larger has continued for the foregoing predetermined time in step S207.

In a case where the state that the ambient volume is the threshold or larger does not continue for the predetermined time, the control unit 100 advances the process from step S207 to step S210, and performs processing in steps S212 and S213. In other words, the control unit 100 maintains the interruption state of the communication via the first wireless communication between the imaging apparatus 1 and the operation apparatus 10 without immediately determining that the quiet state has ended. Thereafter, the control unit 100 performs the processing in steps S216 and S217 in a similar manner.

In a case where the state that the ambient volume is the threshold or larger has continued for the predetermined time, it is considered that such a state that recorded noise does not considerably bother the user in the presence of the large ambient volume (such a state that substantially no noise can be sensed in a mixture of the noise with the recorded ambient voices) has been produced. Accordingly, when the interruption flag is in the on-state in step S208, the control unit 100 clears the interruption flag in step S209.

The control unit 100 advances the process from step S209 to step S210. In a case of a state during moving image recording, the control unit 100 determines whether or not the interruption flag is in the on-state in step S212.

The interruption flag is not in the on-state in step S212 herein, wherefore the control unit 100 performs a process for canceling the interruption state of the first wireless communication. As a result, the first wireless communication between the imaging apparatus 1 and the operation apparatus 10 is restarted.

Thereafter, the control unit 100 ends the notification process for the notification concerning the interruption of the first wireless communication in step S214, and transmits image data to the operation apparatus 10 by the first wireless communication in step S215 to display the received captured image in the monitor area 14. Subsequently, the control unit 100 performs the processing in steps S216 and S217 in a similar manner.

In addition, in a case where moving image recording is performed in a state that the interruption flag is not in the on-state in the communication control mode, a state that noise during recording is bothersome is not produced yet in the ambient environment. Accordingly, the process advances from step S208 to step S210 to perform steps S214, S215, S216, and S217. In other words, the image captured by the imaging apparatus 1 is transmitted to and displayed on the operation apparatus 10 without limiting the first wireless communication during moving image recording in a manner similar to the manner in a case other than the communication control mode.

Note that the first wireless communication may be validated on the basis of operation information received from the operation apparatus 10 of the user even in the wireless limiting mode.

5. Second Embodiment

The communication control process in step S107 in FIG. 4 according to a second embodiment will be described with reference to FIG. 6. Note that processes similar to the corresponding processes in the first embodiment depicted in FIG. 5 are given identical reference signs, and will be only briefly described. For example, the control unit 100 executes the process in FIG. 6 at one frame intervals of a captured image.

According to the second embodiment, a wireless output is changed by lowering radio wave intensity of the first wireless communication in a case where a state that an ambient volume becomes smaller than a threshold has continued for a predetermined time in the wireless limiting mode. A DC offset produced by an overlap of the first wireless communication on the voice signal depicted in FIG. 2 is reduced by lowering the radio wave intensity of the first wireless communication. Accordingly, reduction of noticeable noise recorded during recording of moving images is achievable.

In the communication control process, the control unit 100 detects whether or not a communication limiting mode has been set in step S201.

In a case where the communication limiting mode is not set, the control unit 100 branches the process in accordance with whether or not the current state is a moving image recording state in step S210.

When the current state is not the moving image recording state, the control unit 100 transmits image data in the frame currently captured by the imaging apparatus 1 to the operation apparatus 10 via the first wireless communication in step S215.

As a result, a captured image obtained by the imaging apparatus 1 is displayed on the operation apparatus 10. More specifically, in this case, a captured image in a state before a recording start (standby state) is displayed. Accordingly, during this period, the user selects an object, or waits until moving image recording start timing while checking an object. waits. Thereafter, the control unit 100 performs the processing in steps S216 and S217 in a manner similar to the corresponding manner of the first embodiment.

In a case where the current state is a state during moving image recording in step S210, the process advances to step S306. In addition, in a case where the current mode is not the communication limiting mode, a limiting flag is not turned on, the radio wave intensity is not changed yet in S309, and a notification process is not performed in step S310. Accordingly, an image captured by the imaging apparatus 1 is similarly displayed on the operation apparatus 10 in step S215. In this manner, the user is capable of checking a captured image screen during moving image recording in the monitor area 14 of the operation apparatus 10. Thereafter, the control unit 100 performs the processing in steps S216 and S217 in a similar manner.

When detecting the state that the communication limiting mode has been set in step S201, the control unit 100 advances the process to step S202, and acquires information associated with an input volume from the signal processing unit 107 to monitor a transition of values of the ambient volume. Thereafter, the control unit 100 determines whether or not the value of the ambient volume has become smaller than a threshold in step S203.

In a case where the value of the ambient volume becomes smaller than the threshold, the control unit 100 determines whether or not the state that the ambient volume becomes smaller than the threshold has continued for a predetermined time in step S204.

When it is determined that the state of the volume smaller than the threshold does not continue for the predetermined time in step S204, the control unit 100 determines whether or not the current state of the imaging apparatus 1 is the state during moving image recording in step S210. In a case where the current state is the state during moving image recording, the process advances to step S215 via steps S306, S309, and S310. In other words, at a time when a quiet ambient situation is not considered to continue even in a quiet state, the process advances to step S210 without turning on the limiting flag (PD flag).

In this manner, the control unit 100 advances the process to steps S210, S306, S309, and S215 in this order, and performs control for transmitting image data in the current frame to the operation apparatus 10 even during moving image recording. Accordingly, the image captured by the imaging apparatus 1 is displayed on the operation apparatus 10, wherefore the user is allowed to check the captured image screen during moving image recording in the monitor area 14 of the operation apparatus 10.

Thereafter, the control unit 100 performs the processing in steps S216 and S217 in a similar manner.

In a case where the state of the volume smaller than the threshold is determined to have continued for the predetermined time, the control unit 100 determines whether or not the limiting flag (PD flag) is in the on-state in step S301.

The PD flag is a flag which indicates a period in which the first wireless communication between the imaging apparatus 1 and the operation apparatus 10 should be limited, i.e., a period in which the state of the lowered radio wave intensity in the first wireless communication should be produced. The state of the change of the wireless output refers to a state of lowered radio wave intensity of the first wireless communication according to the second embodiment.

Note that the state of the lowered radio wave intensity of the first wireless communication includes a stopped state of the first wireless communication between the imaging apparatus 1 and the operation apparatus 10. The stop of the first wireless communication between the imaging apparatus 1 and the operation apparatus 10 eliminates the DC offset produced by the overlap of the first wireless communication on the recorded voice signal. Accordingly, reduction of noise recorded during recording of moving images can be achieved.

In a case where the PD flag is not in the on-state, the control unit 100 brings the PD flag into the on-state in step S302. In other words, the control unit 100 brings the flag into the on-state in response to an elapse of a predetermined time in the quiet state.

Thereafter, the control unit 100 advances the process from step S302 to step S210. In a case of a state during moving image recording, the control unit 100 checks the on-state of the PD flag in step S306, and then advances the process to step S307.

The control unit 100 performs a process for lowering radio wave intensity of the first wireless communication in step S307. The DC offset depicted in FIG. 2 decreases by lowering the radio wave intensity of the first wireless communication, wherefore reduction of recorded noise is achievable.

Thereafter, the control unit 100 performs a notification process for notifying the operation apparatus 10 of the state of the lowered radio wave intensity of the first wireless communication in step S308. The notification process is achieved by displaying the notification in the monitor area 14 or the like of the operation apparatus 10, for example. This display is given for a following reason. The lowering of the radio wave intensity may destabilize a reception operation by the operation apparatus 10, and therefore may prevent smooth display of moving images.

The control unit 100 subsequently performs a process for displaying the image captured by the imaging apparatus 1 on the operation apparatus 10 by using the first wireless communication which has lowered radio wave intensity in step S215.

In a case where the PD flag is in the on-state in step S301, the control unit 100 advances the process from the step S301 to the step S210. When the current state is the state during moving image recording, the control unit 100 checks that the PD flag is in the on-state in step S306, and then performs the processing in steps S307, S308, S215, S216, and S217 in a similar manner.

In other words, the control unit 100 determines that the quiet ambient state is still continuing in the communication limiting mode, and maintains the state of the lowered radio wave intensity of the first wireless communication.

In addition, in a case where the ambient volume value becomes the threshold or larger in step S203 during moving image recording in the on-state of the PD flag in this manner, the control unit 100 determines whether or not the state that the ambient volume is the threshold or larger has continued for the foregoing predetermined time in step S207.

In a case where the state that the ambient volume is the threshold or larger does not continue for the predetermined time, the control unit 100 advances the process from step S207 to step S210, and performs processing in steps S306, S309, S310, and S215. In other words, the control unit 100 maintains the state of the lowered radio wave intensity of the first wireless communication without immediately determining that the quiet ambient state has ended. Thereafter, the control unit 100 performs the processing in steps S216 and S217 in a similar manner.

In a case where the state that the ambient volume is the threshold or larger has continued for the predetermined time, it is considered that such a state that recorded noise does not considerably bother the user in the presence of the large ambient volume (such a state that substantially no noise can be sensed in a mixture of the noise with the recorded ambient voices) has been produced. Accordingly, the control unit 100 checks that the PD flag is in the on-state in step S303, and then clears the PD flag in step S304.

The control unit 100 advances the process from step S209 to step S210. In a case of a state during moving image recording, the control unit 100 determines whether or not the PD flag is in the on-state in step S306.

The PD flag is not in the on-state in step S306 herein, wherefore the control unit 100 performs a process for canceling the state of the lowered radio wave intensity of the first wireless communication (returning radio wave intensity to the original state) in step S309. As a result, the radio wave intensity of the first wireless communication is returned to the state before the lowered state.

Thereafter, the control unit 100 ends the notification process for notification concerning the lowered radio wave intensity of the first wireless communication in step S310, and transmits image data to the operation apparatus 10 by the first wireless communication in step S215 to display the received captured image in the monitor area 14. Thereafter, the control unit 100 performs the processing in steps S216 and S217 in a similar manner.

In addition, in a case where moving image recording is performed with the PD flag not in the on-state in the communication control mode, a state that noise during recording becomes bothersome is not produced yet in the ambient environment. Accordingly, the process advances from step S303 to step S210 to perform processing in steps S306, S309, S310, S215, S216, and S217. In other words, the image captured by the imaging apparatus 1 is transmitted to and displayed on the operation apparatus 10 in a state without lowering the radio wave intensity of the first wireless communication during moving image recording in a manner similar to the manner in a case other than the communication control mode.

6. Third Embodiment

The communication control process in step S107 in FIG. 4 according to a third embodiment will be described with reference to FIGS. 7 and 8. Note that processes similar to the corresponding processes in the first embodiment depicted in FIG. 5 are given identical reference signs. For example, the control unit 100 executes the process in FIG. 7 at one frame intervals of a captured image.

According to the third embodiment, a wireless output is changed by lowering a frame rate of image data transferred in the first wireless communication in a case where a state that an ambient volume becomes smaller than a threshold in a wireless limiting mode has continued for a predetermined time. Lowering of the frame rate of the transferred image data reduces the frequency of the effects exerted by the first wireless communication on the voice signal depicted in FIG. 2. Accordingly, reduction of noticeable noise recorded during recording of moving images is achievable.

Initially, the communication control process (step S107) according to the third embodiment will be described with reference to FIG. 7.

In the communication control process, the control unit 100 detects whether or not a communication limiting mode has been set in step S201.

In a case where the communication limiting mode is not set, the control unit 100 branches the process in accordance with whether or not the current state is a moving image recording state in step S210.

When the current state is not the state during moving image recording, the control unit 100 performs an image data transmission process in step S409. Details of the image data transmission process in step S409 will be described below.

As a result, a captured image obtained by the imaging apparatus 1 is displayed on the operation apparatus 10. More specifically, in this case, a captured image in a state before a recording start (standby state) is displayed. Accordingly, during this period, the user selects an object, or waits until moving image recording start timing while checking an object. Thereafter, the control unit 100 performs processing in steps S216 and S217 in a manner similar to the corresponding manner of the described embodiments.

In a case where the current state is a state during moving image recording in step S210, the process advances to step S406. In addition, in a case where the current mode is not the communication limiting mode, a limiting flag is not turned on, and a notification process in step S408 is not performed. Accordingly, an image captured by the imaging apparatus 1 is displayed on the operation apparatus 10 in a similar manner in step S409. Accordingly, the user is capable of checking a captured image screen during moving image recording in the monitor area 14 of the operation apparatus 10. Thereafter, the control unit 100 performs the processing in steps S216 and S217 in a similar manner.

When detecting the state that the communication limiting mode has been set in step S201, the control unit 100 advances the process to step S202, and acquires information associated with an input volume from the signal processing unit 107 to monitor a transition of values of the ambient volume. Thereafter, the control unit 100 determines whether or not the value of the ambient volume has become smaller than a threshold in step S203.

In a case where the value of the ambient volume becomes smaller than the threshold, the control unit 100 determines whether or not the state that the ambient volume becomes smaller than the threshold has continued for a predetermined time in step S204.

When it is determined that the state of the volume smaller than the threshold does not continue for the predetermined time in step S204, the control unit 100 determines whether or not the current state of the imaging apparatus 1 is the state during moving image recording in step S210. In a case where the current state is the state during moving image recording, the process advances to step S409 via steps S406 and S408. In other words, at a time when a quiet ambient situation is not considered to continue even in a quiet state, the process advances to step S210 without turning on the limiting flag (FD flag).

In this manner, the control unit 100 advances of the process to steps S210, S406, S408, and S409 in this order, and performs control for transmitting image data in the current frame to the operation apparatus 10 as understood from FIG. 8 described below even during moving image recording. Accordingly, the image captured by the imaging apparatus 1 is displayed on the operation apparatus 10, wherefore the user is allowed to check the captured image screen during moving image recording on the monitor area 14 of the operation apparatus 10.

Thereafter, the control unit 100 performs the processing in steps S216 and S217 in a similar manner.

In a case where the state of the volume smaller than the threshold is determined to have continued for the predetermined time, the control unit 100 determines whether or not the limiting flag (FD flag) is in the on-state in step S401.

The FD flag is a flag which indicates a period in which the first wireless communication between the imaging apparatus 1 and the operation apparatus 10 should be limited, i.e., a period in which a state of the lowered frame rate of image data transferred by the first wireless communication should be produced. The state of the change of the wireless output refers to a state of a lowered frame rate of image data transferred by the first wireless communication according to the third embodiment.

In a case where the FD flag is not in the on-state, the control unit 100 brings the FD flag into the on-state in step S402. In other words, the control unit 100 brings the flag into the on-state in response to an elapse of a predetermined time in the quiet state.

Thereafter, the control unit 100 advances the process from step S402 to step S210. In a case of a state during moving image recording, the control unit 100 checks that the FD flag is in the on-state in step S406, and then advances the process to step S407.

The control unit 100 performs a notification process for notification concerning the state of the lowered frame rate of the transferred image data in step S407. The notification process is achieved by displaying the notification in the monitor area 14 of the operation apparatus 10, for example.

Thereafter, the control unit 100 performs processing in step S409. In this case, the control unit 100 performs a process for transmitting image data captured by the imaging apparatus 1 to the operation apparatus 10 at a lowered frame rate (this processing will be described below with reference to FIG. 8). Subsequently, the control unit 100 performs the processing in steps S216 and S217 in a similar manner.

In a case where the FD flag is in the on-state in step S401, the control unit 100 advances the process from the step S401 to the step S210. When the current state is the state during moving image recording, the control unit 100 checks that the FD flag is in the on-state in step S406, and then performs the processing in steps S407, S409, S216, and S217 in a similar manner.

In other words, the control unit 100 determines that the quiet ambient state is still continuing in the communication limiting mode, and maintains the state of the lowered frame rate of the image data transferred by the first wireless communication.

In addition, in a case where the ambient volume value becomes the threshold or larger in step S203 during moving image recording in the on-state of the FD flag in this manner, the control unit 100 determines whether or not the state that the ambient volume is the threshold or larger has continued for the foregoing predetermined time in step S207.

In a case where the state that the ambient volume is the threshold or larger does not continue for the predetermined time, the control unit 100 advances the process from step S207 to step S210, and performs processing in steps S407 and S409. In other words, the control unit 100 maintains the state of the lowered frame rate of the image data transferred by the first wireless communication without immediately determining that the quiet ambient state has ended. Thereafter, the control unit 100 performs the processing in steps S216 and S217 in a similar manner.

In a case where the state that the ambient volume is the threshold or larger has continued for the predetermined time, it is considered that such a state that recorded noise does not considerably bother the user in the presence of the large ambient volume has been produced. Accordingly, the control unit 100 checks that the FD flag is in the on-state in step S403, and then clears the FD flag in step S404.

The control unit 100 advances the process from step S404 to step S210. In a case of a state during moving image recording, the control unit 100 determines whether or not the FD flag is in the on-state in step S406.

The FD flag has been cleared in step S406 herein, wherefore the control unit 100 ends the notification process for notification concerning the lowered state of the frame rate of the image data transferred by the first wireless communication in step S407, and transmits image data to the operation apparatus 10 at a normal frame rate by the first wireless communication in step S409 to display the received captured image in the monitor area 14. Thereafter, the control unit 100 performs the processing in steps S216 and S217 in a similar manner.

In addition, in a case where moving image recording is performed in a state that the FD flag is not in the on-state in the communication control mode, a state that noise during recording becomes bothersome is not produced yet in the ambient environment. Accordingly, the process advances from step S403 to step S210 to perform processing in steps S406, S408, S409, S216, and S217. In other words, the image captured by the imaging apparatus 1 is displayed on the operation apparatus 10 without limiting the first wireless communication (lowering the frame rate) during moving image recording in a manner similar to the manner in a case other than the communication control mode.

The image data transmission process (step S409) according to the third embodiment will be herein described with reference to FIG. 8. The image data transmission process is a process for transmitting image data from the imaging apparatus 1 to the operation apparatus 10 for each elapse of a predetermined time.

In the image data transmission process, the control unit 100 increments a counter value by one (+1) in step S501. Assuming that the process in FIG. 7 is performed at one frame intervals in the third embodiment, an increase of the counter value by one corresponds to an elapse of one frame interval.

The control unit 100 determines whether or not the FD flag is in the on-state in step S502.

In a case where the FD flag is in the on-state, the control unit 100 advances the process to step S503, and determines whether the counter value is 10 or more (whether ten frames have elapsed from image data transmission immediately before). In a case where the counter value is smaller than ten, the control unit 100 advances the process to step S216 in FIG. 7 without transmitting the image data to the operation apparatus 10. In other words, the control unit 100 does not transmit the image data in the current frame.

In a case where the counter value reaches ten in step S503, the control unit 100 transmits the image data to the operation apparatus 10 via the first wireless communication.

Thereafter, the control unit 100 resets the counter value to 0 (counter=0) in step S505, and advances the process to step S216 in FIG. 7 to hereinafter perform similar processing.

Accordingly, image data in one frame is transmitted for every ten frames during the on-state period of the FD flag. As a result, a captured image is displayed at intervals of ten frames in the monitor area 14 of the operation apparatus 10. In other words, a captured image is displayed at a lowered frame rate in the monitor area 14.

Lowering of the frame rate of the transferred image data can reduce the frequency of the effects exerted by the first wireless communication on the voice signal, and reduce noticeable noise in a quiet state in recorded voices. Particularly, extreme lowering of the frame rate can produce a state substantially similar to the interruption state of the first wireless communication in the first embodiment.

In a case where the FD flag is in the off-state in step S502, the control unit 100 transmits image data to the operation apparatus 10 via the first wireless communication in step S504 to display a captured image received at intervals of one frame in the monitor area 14. In other words, normal display of a captured image is performed without lowering a frame rate of image data in a period in which the FD flag is not in the on-state.

The control unit 100 resets the counter value to zero (counter=0) in step S505, and advances the process to step S216 in FIG. 7 to hereinafter perform similar processing.

7. Fourth Embodiment

The communication control process in step S107 in FIG. 4 according to a fourth embodiment will be described with reference to FIG. 9. Note that processes similar to the corresponding processes in the first embodiment depicted in FIG. 5 are given identical reference signs. For example, the control unit 100 executes the process in FIG. 9 at one frame intervals of a captured image.

According to the fourth embodiment, wireless communication is controlled by lowering a resolution of image data transferred in the first wireless communication in a case where a state that an ambient volume becomes smaller than a threshold has continued for a predetermined time in a wireless limiting mode.

Lowering of the resolution of the transferred image data achieves collective transfer of image data in a plurality of frames. In this case, the number of times of the first wireless communication for transfer of image data decreases, wherefore the transfer interval of image data can be made longer.

Accordingly, the frequency of effects exerted by the first wireless communication on the voice signal depicted in FIG. 2 decreases, wherefore reduction of noise recorded during recording of moving images is achievable.

In the communication control process, the control unit 100 detects whether or not a communication limiting mode has been set in step S201.

In a case where the communication limiting mode is not set, the control unit 100 branches the process in accordance with whether or not the current state is a moving image recording state in step S210.

When the current state is not the moving image recording state, the control unit 100 transmits image data in the frame currently captured by the imaging apparatus 1 to the operation apparatus 10 via the first wireless communication in step S215. As a result, a captured image obtained by the imaging apparatus 1 is displayed on the operation apparatus 10. More specifically, in this case, a captured image in a state before a recording start (standby state) is displayed. Accordingly, during this period, the user selects an object, or waits until moving image recording start timing while checking an object. Thereafter, the control unit 100 performs processing in steps S216 and S217 in a manner similar to the corresponding manner of the described embodiments.

In a case where the current state is a state during moving image recording in step S210, the process advances to step S406. In addition, in a case where the current mode is not the communication limiting mode, a limiting flag is not turned on, and a notification process in step S408 is not performed. Accordingly, an image captured by the imaging apparatus 1 is displayed on the operation apparatus 10 in a similar manner in step S215. Accordingly, the user is capable of checking a captured image screen during moving image recording in the monitor area 14 of the operation apparatus 10. Thereafter, the control unit 100 performs the processing in steps S216 and S217 in a similar manner.

When detecting the state that the communication limiting mode has been set in step S201, the control unit 100 advances the process to step S202, and acquires information associated with an input volume from the signal processing unit 107 to monitor a transition of values of the ambient volume. Thereafter, the control unit 100 determines whether or not the value of the ambient volume has become smaller than a threshold in step S203.

In a case where the value of the ambient volume becomes smaller than the threshold, the control unit 100 determines whether or not the state that the ambient volume becomes smaller than the threshold has continued for a predetermined time in step S204.

When it is determined that the state of the volume smaller than the threshold does not continue for the predetermined time in step S204, the control unit 100 determines whether or not the current state of the imaging apparatus 1 is the state during moving image recording in step S210. In a case where the current state is the state during moving image recording, the process advances to step S215 via steps S406 and S408. In other words, at a time when a quiet ambient situation is not considered to continue even in a quiet state, the process advances to step S210 without turning on the limiting flag (RD flag).

In this manner, the control unit 100 advances the process to steps S210, S406, S408, and S215 in this order, and performs control for transmitting image data in the current frame to the operation apparatus 10 even during moving image recording. Accordingly, the image captured by the imaging apparatus 1 is displayed on the operation apparatus 10, wherefore the user is allowed to check the captured image screen during moving image recording on the monitor area 14 of the operation apparatus 10.

Thereafter, the control unit 100 performs the processing in steps S216 and S217 in a similar manner.

In a case where the state of the volume smaller than the threshold has continued for the predetermined time is determined, the control unit 100 determines whether or not the limiting flag (RD flag) is in the on-state in step S601.

The RD flag is a flag which indicates a period in which the first wireless communication between the imaging apparatus 1 and the operation apparatus 10 should be limited, i.e., a period in which a state of a lowered resolution of image data transferred by the first wireless communication should be produced. The state of the change of the wireless output refers to a state of a lowered resolution of image data transferred by the first wireless communication according to the fourth embodiment.

In a case where the RD flag is not in the on-state, the control unit 100 brings the RD flag into the on-state in step S602. In other words, the control unit 100 brings the flag into the on-state in response to an elapse of a predetermined time in the quiet state.

Thereafter, the control unit 100 advances the process from step S602 to step S210. In a case of a state during moving image recording, the control unit 100 checks that the RD flag is in the on-state in step S406, and then advances the process to step S407.

The control unit 100 performs a notification process for notification concerning the state of the lowered resolution of the transferred image data in step S407. The notification process is achieved by displaying the notification in the monitor area 14 or the like of the operation apparatus 10, for example.

Thereafter, the control unit 100 transmits image data captured by the imaging apparatus 1 and having a lowered resolution to the operation apparatus 10 in step S410. As a result, an image with a resolution lower than that of the image captured by the imaging apparatus 1 is displayed on the operation apparatus 10.

Note that a plurality of frames having a lowered resolution is collectively transmitted in this case, for example. Image data for two frames is transferred by one-time burst transmission, for example. In this case, it is sufficient if the transmission in step S410 is executed for every one frame. In this manner, the burst transmission interval increases.

Thereafter, the control unit 100 performs processing in steps S216 and S217 in a similar manner.

In a case where the RD flag is in the on-state in step S601, the control unit 100 advances the process from the step S601 to the step S210. When the current state is the state during moving image recording, the control unit 100 checks that the RD flag is in the on-state in step S406, and then performs processing in steps S407, S410, S216, and S217 in a similar manner.

In other words, the control unit 100 determines that the quiet ambient state is still continuing in the communication limiting mode, and maintains a state where the image data with a lowered resolution is transmitted by the first wireless communication (a state where the burst transmission interval is increased).

In addition, in a case where the ambient volume value becomes the threshold or larger in step S203 during moving image recording in the on-state of the RD flag in this manner, the control unit 100 determines whether or not the state that the ambient volume is the threshold or larger has continued for the foregoing predetermined time in step S207.

In a case where the state that the ambient volume is the threshold or larger does not continue for the predetermined time, the control unit 100 advances the process from step S207 to step S210, and performs processing in steps S406, S407, and S410. In other words, the control unit 100 maintains the state that the image data with the lowered resolution is transmitted by the first wireless communication without immediately determining that the quiet ambient state has ended. Thereafter, the control unit 100 performs the processing in steps S216 and S217 in a similar manner.

In a case where the state that the ambient volume is the threshold or larger has continued for the predetermined time, it is considered that such a state that recorded noise does not considerably bother the user in the presence of the large ambient volume has been produced. Accordingly, the control unit 100 checks that the RD flag is in the on-state in step S603, and then clears the RD flag in step S604.

The control unit 100 advances the process from step S604 to step S210. In a case of a state during moving image recording, the control unit 100 determines whether or not the RD flag is in the on-state in step S406.

The RD flag has been cleared in step S406 herein, wherefore the control unit 100 ends the notification process for notification concerning the state of the lowered resolution of the transferred image data in step S408, and transmits image data having a not lowered resolution to the operation apparatus 10 by the first wireless communication in step S215 to display the received captured image in the monitor area 14. Thereafter, the control unit 100 performs the processing in steps S216 and S217 in a similar manner.

In addition, in a case where moving image recording is performed in a state that the RD flag is not in the on-state in the communication control mode, a state that noise during recording becomes bothersome is not produced yet in the ambient environment. Accordingly, the process advances from step S603 to step S210 to perform processing in steps S406, S408, S215, S216, and S217. In other words, the image data captured by the imaging apparatus 1 and having a not lowered resolution is transmitted to and displayed on the operation apparatus 10 without limiting the first wireless communication during moving image recording in a manner similar to the manner in a case other than the communication control mode.

8. Summary and Modified Examples

Following advantageous effects are produced according to the embodiments described above.

The imaging apparatus 1 as the communication controller according to the embodiments includes: the wireless communication unit 110 that performs the first wireless communication using the first wireless communication method (Wi-Fi), and the second wireless communication using the second wireless communication method (BT); and the control unit 100 that detects a volume of voice data, and changes a wireless output of the first wireless communication on the basis of the detected volume.

In this case, the communication controller 1 gives the wireless output which changes in accordance with the detected ambient volume during the first wireless communication. In addition, the second wireless communication achieves wireless communication regardless of the ambient volume.

The second wireless communication is therefore normally performed even during a change of the wireless output of the first wireless communication. Accordingly, wireless communication is achievable regardless of the communication state of the first wireless communication.

In addition, the imaging apparatus 1 further includes: the recording unit 109 that records voice data concentrated by the microphone 113 in a recording medium; and the imaging unit 103 that images an object. The recording unit 109 performs a process for recording image data acquired by the imaging unit 103 in the recording medium.

In this case, the imaging apparatus 1 (communication controller) records the voice data concentrated by the microphone 113 and image data in the recording medium.

Accordingly, generation of noise during data recording can be controlled by changing the wireless output of the first wireless communication during recording of image data in the recording medium.

In addition, the wireless communication unit 110 transmits, via the first wireless communication, the image data acquired by the imaging unit 103, and receives, via the second wireless communication, operation information from the operation apparatus 10 (external device).

The imaging apparatus 1 (communication controller) transmits image data indicating an object imaged by the imaging unit 103 to the operation apparatus 10 (external device) by the wireless output changed in accordance with the detected ambient volume during recording the image data and voice signals.

A radio wave is chiefly output during transmission of data such as image data in the first wireless communication. Radio wave noise of the first wireless communication output in this manner is mixed into the voice signal during recording. In this case, the DC offset d depicted in FIG. 2 may be generated, and recorded as noise during moving image recording.

This noise does not become considerably noticeable in such a time period in which a certain high level of ambient voices are generated during moving image capturing. However, this noise becomes extremely noticeable during reproduction at a quiet moment produced in a presentation time in a school art festival, or a quiet period during a performance in a concert venue, for example.

In this case, effects of the radio wave of the first wireless communication exerted on the voice signal are reduced by changing the wireless output of the first wireless communication during the foregoing time period in the quiet ambient environment. In this manner, reduction of generation of noise during data recording, improvement of recording accuracy in a silent time, and comfortable viewing and listening of captured image data by the user are achievable.

Accordingly, improvement of user operability, usability, work efficiency and the like is achievable.

The present technology is particularly effective in an environment where a silent state, in which noise is noticeable, is frequently produced, such as classes in school and music recitals, for example.

In addition, the second wireless communication achieves wireless communication with the operation apparatus 10 (external device) regardless of the ambient volume.

A non-communicable state between the imaging apparatus 1 and the operation apparatus 10 may be produced in a case of interruption of the wireless output of the first wireless communication for reduction of generation of noise during data recording, for example. In this case, the user is allowed to operate the imaging apparatus 1 through operation of the operation apparatus 10 by maintaining communication using the second wireless communication even at the time of interruption of the first wireless communication. In addition, the second wireless communication is capable of functioning as auxiliary communication means even in a case where the first wireless communication is disconnected by an unexpected accident in a condition other than the communication limiting mode.

Figure 5:
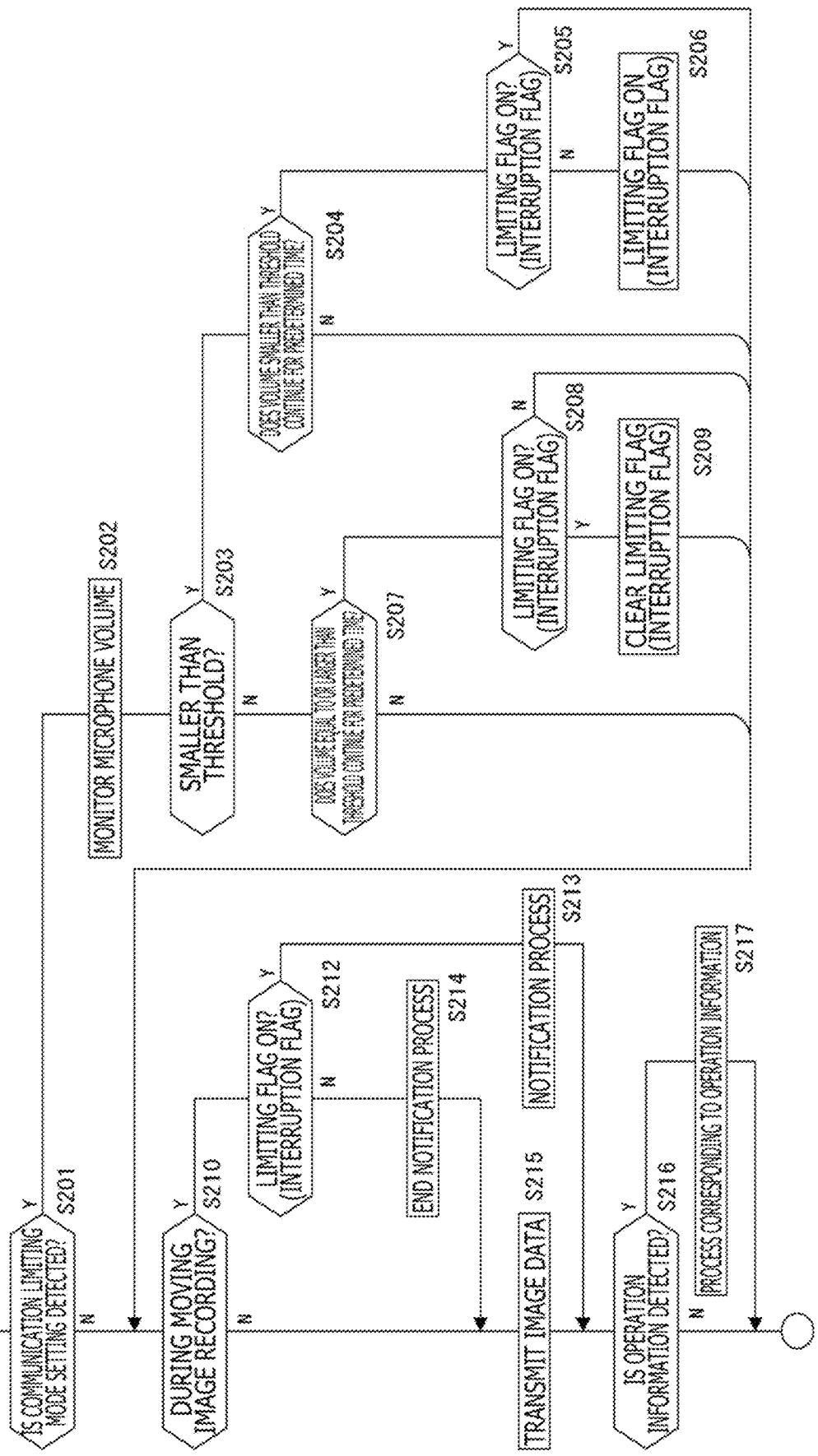
FIG. 5 is a flowchart of a communication control process according to a first embodiment of the present technology.

In addition, the control unit 100 produces the state for changing the wireless output of the first wireless communication when the detected volume becomes smaller than the threshold (S203 in FIG. 5).

The radio wave included in the first wireless communication and that may generate noise during recording of captured image data and the voice signal is reduced by changing the wireless output of the first wireless communication on an assumption that the ambient environment is quiet when the volume becomes smaller than the threshold.

In this manner, the wireless output of the first wireless communication can be automatically changed in accordance with the ambient situation without user operation of the operation apparatus 10 based on the ambient situation. Accordingly, reduction of noise generation during data recording is achievable.

In addition, the control unit 100 produces the state for changing the wireless output of the first wireless communication when the period in which the detected volume becomes smaller than the threshold continues for a predetermined period or longer (S204 in FIG. 5).

The radio wave which is included in the first wireless communication and may generate noise in the voice signal during recording of captured image data is reduced by changing the wireless output of the first wireless communication on an assumption that the ambient environment is quiet in a case where a state that the ambient volume is smaller than the threshold continues for the predetermined period or longer.

In this manner, the state for changing the wireless output of the first wireless communication can be produced at the time when a possibility of a quiet ambient situation reaches a certain high level.

The change of the wireless output of the first wireless communication stops display of the image during imaging on the operation apparatus 10 by interruption of the first wireless communication, and lowers visibility by lowering of the resolution of the transferred image data. Accordingly, display of the image on the operation apparatus 10 stops, or image quality lowers every time the ambient volume instantaneously becomes smaller than the threshold. In this case, the user feels inconvenience. In addition, even when a quiet state is instantaneously produced, noise generated by the effect of the radio wave at that time is rarely sensed.

Accordingly, generation of noise during data recording can be reduced without lowering usability for the user by changing the wireless output of the first wireless communication at the time when the quiet ambient situation has continued for several seconds, for example.

In addition, the control unit 100 cancels the state for changing the wireless output of the first wireless communication when the period in which the detected volume becomes equal to or larger than the threshold continues for a predetermined period or longer (S207 in FIG. 5).

The state for changing the wireless output of the first wireless communication is cancelled on an assumption that the ambient situation is not quiet in a case where the period in which the ambient volume is the threshold or larger continues for the predetermined period or longer.

In this manner, the state for limiting communication of the first wireless communication can be cancelled at the time when a possibility that the ambient situation is not quiet reaches a certain high level. In other words, the monitor area 14 of the operation apparatus 10 can be returned to an easily visible state.

In the communication limiting mode, display of the image on the operation apparatus 10 is stopped, or the image quality is lowered. Accordingly, in a scene where noise during moving image recording is not easily recognized in a not quiet ambient situation, the captured image screen of the imaging apparatus 1 to be displayed on the operation apparatus 10 is preferably brought into a state easily recognizable by the user.

In addition, control unit 100 changes the wireless output of the first wireless communication in accordance with execution or non-execution of the first wireless communication (FIG. 5).

A state where image data captured by the imaging apparatus 1 is not transmitted to the operation apparatus 10 is produced by interrupting transmission of image data to the operation apparatus 10 (external device) in accordance with non-execution of the first wireless communication.

Accordingly, noise generated by the radio wave of the first wireless communication is eliminated from the voice signal, wherefore reduction of noise recorded during moving image recording and noticeable and offensive to ears in a quiet and small-ambient-volume place is achievable.

Figure 6:
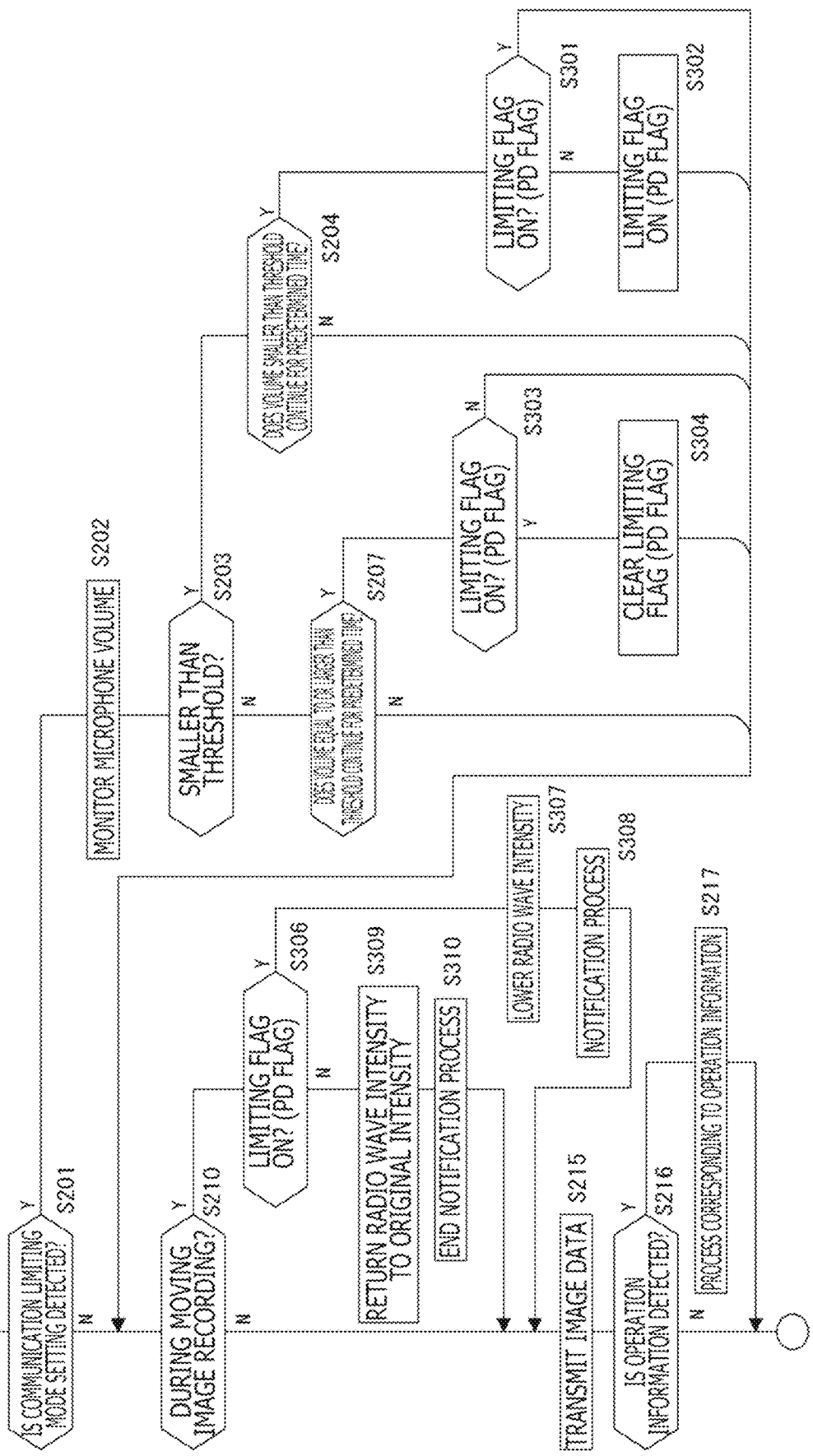
FIG. 6 is a flowchart of a communication control process according to a second embodiment of the present technology.

In addition, the control unit 100 changes the wireless output of the first wireless communication by lowering radio wave intensity of the first wireless communication (FIG. 6).

Lowering the radio wave intensity of the first wireless communication reduces a DC offset produced by an overlap of the first wireless communication on the recorded voice signal. Accordingly, reduction of noise recorded during recording of moving images is achievable.

In addition, the control unit 100 changes the wireless output of the first wireless communication by lowering a frame rate of image data acquired by the imaging unit 103 (FIGS. 7 and 8).

Lowering of the frame rate of the transferred image data reduces the frequency of the effects exerted by the first wireless communication on the voice signal. In this case, the transmission interval of burst transmission of the wireless output increases, wherefore noise recorded during recording of voice data becomes less noticeable. Accordingly, reduction of noise recorded during recording of moving images is achievable.

In addition, the control unit 100 changes the wireless output of the first wireless communication by lowering a resolution of image data acquired by the imaging unit 103 (FIG. 9).

Lowering of the resolution of the transferred image data achieves collective transfer of image data in a plurality of frames to the operation apparatus 10 (external device).

Lowering of the resolution of the transferred image data achieves collective transfer of image data in a plurality of frames. In this case, the number of times of the first wireless communication for transfer of image data decreases, wherefore the transfer interval of image data can be made longer. With increase in the transfer interval, noise recorded during recording of voice data becomes less noticeable. Accordingly, reduction of noise recorded during recording of moving images is achievable.

In addition, it is considered that a wireless limiting state for changing the wireless output of the first wireless communication on the basis of the detected volume is provided, and the control unit 100 shifts to the wireless limiting state when the recording unit 109 records the concentrated voice signal in the recording medium.

In this case, a radio wave included in the first wireless communication and that may generate noise in the voice signal decreases during recording of concentrated voice data in the recording medium. Accordingly, reduction of noise recorded during recording of moving images is achievable.

In addition, the control unit 100 cancels the wireless limiting state when recording of the concentrated voice data in the recording medium ends (S214 in FIG. 5).

In this case, the state for changing the wireless output of the first wireless communication in accordance with the ambient volume is cancelled in response to an end of recording of concentrated voice data in the recording medium in a condition where noise may be recorded. In this manner, usability for the user can be secured by preventing establishment of the state for limiting the wireless communication in situations other than recording of the concentrated voice data in the recording medium.

In addition, the notification unit 120 that gives a notification that the control unit 100 has changed the wireless output of the first wireless communication is provided (S213 in FIG. 5).

The control unit 100 gives a user a recognition that a change of a display state of the operation apparatus 10 (external device) is produced by a change of the wireless output of the first wireless communication.

According to the present technology, the display state of the operation apparatus 10 (external device) may be changeable. In this case, some users have a doubt that the device has broken down. Accordingly, the user is allowed to use the imaging apparatus 1 with a sense of security on the basis of the notification thus issued.

In addition, the user can visually recognize imaging currently performed in the wireless limiting mode on the basis of the notification given in the monitor area 14 of the operation apparatus 10.

Note that the configuration and the processing example of the flash apparatus 1 according to the embodiments are presented by way of example. Various configuration examples and processing examples other than those described above are assumable.

According to the present technology, it is also considered that the wireless output is changed by extremely reducing the burst length of Wi-Fi. Extreme reduction of the burst length of Wi-Fi is effective in the point that noise generated during recording is difficult to hear by human ears in this condition. For example, wireless communication using 2.4 GHz band has 24 MHz for 100 cycles. Accordingly, substantially no noise is heard by human ears when the cycle of the burst transfer is restricted to 100 cycles or shorter.

In addition, according to the present technology, the respective embodiments described above may be combined. For example, lowering of the frame rate of the image data transferred by the first wireless communication, and also lowering of the resolution of the transferred image data can be achieved by combining the third embodiment and the fourth embodiment.

With lowering of the resolution of the image data, a large amount of image data can be transferred by one-time transfer. Moreover, with lowering of the frame rate of the transferred image data, the frequency of effects exerted on the voice signal by the first wireless communication decreases.

Accordingly, further reduction of noise recorded during recording of moving image is achievable.

In addition, according to the present technology, it is also considered that the degree of the change and the type of the change of the wireless output (e.g., radio wave intensity, frame rate of image data, and resolution of image data) are varied on the basis of attribute information associated with the user, such as the age and the current position.

For example, the resolution may be adjusted to a resolution sufficient for visibility in accordance with the age of the user at the time of lowering of the resolution of the image data according to the fourth embodiment. In this manner, reduction of noise recorded during recording of moving images is achievable while securing visibility of the user.

A program according to the embodiments of the present invention is a program under which an imaging apparatus executes: a function of performing the first wireless communication using the first wireless communication method, and the second wireless communication using the second wireless communication method; and a function of detecting a volume of voice data, and changing a wireless output of the first wireless communication on the basis of the detected volume.

More specifically, the program is a program under which the control unit 100 as an arithmetic processing unit executes any one of the processes depicted in FIGS. 4 to 9.

This program facilitates implementation of the imaging apparatus 1 according to the present embodiments.

In addition, this program may be stored beforehand in a recording medium built in a device such as an arithmetic processing unit, a ROM within a microcomputer including a CPU, and others. Alternatively, the program may be temporarily or permanently retained (stored) in a removable recording medium such as a semiconductor memory, a memory card, an optical disk, a magneto-optical disk, and a magnetic disk. In addition, this removable recording medium may be provided as so-called package software.

In addition, this program may be installed in a personal computer or the like from a removable recording medium, or downloaded from a download site via a network such as a LAN, the internet and the like.

Note that the imaging apparatus 1 and the operation apparatus 10 have been described in the present description by way of example. However, the present technology is applicable to various modes of communication devices as long as wireless communication with each other is achievable.

In addition, advantageous effects to be produced are not limited to those described in the present description only by way of example, and may include other advantageous effects.

Note that the present technology may have following configurations.

(1)

A communication controller including:

a wireless communication unit that performs first wireless communication using a first wireless communication method, and second wireless communication using a second wireless communication method; and a control unit that detects a volume of a voice, and changes a wireless output of the first wireless communication on the basis of the detected volume.

(2)

The communication controller according to (1), further including:

a recording unit that records the voice concentrated by a microphone in a recording medium; and an imaging unit that images an object, in which the recording unit performs a process for recording image data acquired by the imaging unit in the recording medium.

(3)

The communication controller according to (2), in which the wireless communication unit transmits, via the first wireless communication, the image data acquired by the imaging unit, and receives, via the second wireless communication, operation information from an external device.

(4)

The communication controller according to any one of (1) to (3), in which the control unit produces a state for changing the wireless output of the first wireless communication when the detected volume becomes smaller than a threshold.

(5)

The communication controller according to any one of (1) to (4), in which the control unit produces a state for changing the wireless output of the first wireless communication when a period in which the detected volume becomes smaller than a threshold continues for a predetermined period or longer.

(6)

The communication controller according to (4) or (5), in which the control unit cancels the state for changing the wireless output of the first wireless communication when a period in which the detected volume becomes equal to or larger than a threshold continues for a predetermined period or longer.

(7)

The communication controller according to any one of (1) to (6), in which the control unit changes the wireless output of the first wireless communication in accordance with execution or non-execution of the first wireless communication.

(8)

The communication controller according to any one of (1) to (7), in which the control unit changes the wireless output of the first wireless communication by lowering radio wave intensity of the first wireless communication.

(9)

The communication controller according to any one of (3) to (8), in which the control unit changes the wireless output of the first wireless communication by lowering a frame rate of image data acquired by the imaging unit.

(10)

The communication controller according to any one of (3) to (9), in which the control unit changes the wireless output of the first wireless communication by lowering a resolution of image data acquired by the imaging unit.

(11)

The communication controller according to any one of (2) to (10), in which a wireless limiting state for changing the wireless output of the first wireless communication on the basis of the detected volume is provided, and the control unit shifts to the wireless limiting state when the recording unit records the concentrated voice in the recording medium.

(12)

The communication controller according to (11), in which the control unit cancels the wireless limiting state when recording of the concentrated voice in the recording medium ends.

(13)

The communication controller according to any one of (1) to (12), further including:

a notification unit that gives a notification that the control unit has changed the wireless output of the first wireless communication.

(14)

A control method of a communication controller including:

performing first wireless communication using a first wireless communication method, and second wireless communication using a second wireless communication method; and detecting a volume of a voice, and changing a wireless output of the first wireless communication on the basis of the detected volume.

(15)

A program for causing a computer to execute a control method of a communication controller, the control method including:

performing first wireless communication using a first wireless communication method, and second wireless communication using a second wireless communication method; and detecting a volume of a voice, and changing a wireless output of the first wireless communication on the basis of the detected volume.

Reference Signs List

1 . . . Imaging apparatus, 10 . . . Operation apparatus, 100 . . . Control unit, 103 . . . Imaging unit, 109 . . . Recording unit, 110 . . . Wireless communication unit, 113 . . . Microphone

The invention claimed is:

1. A communication controller, comprising:
a wireless communication unit configured to execute first wireless communication based on a first wireless communication method, and second wireless communication based on a second wireless communication method;
an imaging device configured to acquire image data; and
circuitry configured to:
  detect a volume of a voice;
  change a wireless output of the first wireless communication based on the detected volume;
  transmit, via the first wireless communication, the image data from the imaging device to an external device; and
  receive, via the second wireless communication having a lower transfer rate than the first wireless communication, operation information from the external device.

2. The communication controller according to claim 1, wherein
the imaging device is configured to image an object to acquire the image data, and
the circuitry is further configured to:
  record the voice concentrated by a microphone in a recording medium;
  execute a process to record the image data in the recording medium.

3. The communication controller according to claim 1, wherein the circuitry is further configured to change the wireless output of the first wireless communication in a case where the detected volume becomes smaller than a threshold.

4. The communication controller according to claim 1, wherein the circuitry is further configured to change the wireless output of the first wireless communication in a case where a period in which the detected volume is smaller than a threshold continues for at least a determined period.

5. The communication controller according to claim 3, wherein the circuitry is further configured to
cancel a process of the change of the wireless output of the first wireless communication in a case where a period in which the detected volume is equal to or larger than the threshold continues for at least a determined period.

6. The communication controller according to claim 1, wherein the circuitry is further configured to change the wireless output of the first wireless communication in accordance with one of execution of the first wireless communication or non-execution of the first wireless communication.

7. The communication controller according to claim 1, wherein the circuitry is further configured to change the wireless output of the first wireless communication by decrease of a radio wave intensity of the first wireless communication.

8. The communication controller according to claim 1, wherein the circuitry is further configured to change the wireless output of the first wireless communication by decrease of a frame rate of the image data.

9. The communication controller according to claim 1, wherein the circuitry is further configured to change the wireless output of the first wireless communication by decrease of a resolution of the image data.

10. The communication controller according to claim 2, wherein the circuitry is further configured to:
switch to a wireless limiting state at a time at which the circuitry records the concentrated voice in the recording medium; and
change the wireless output of the first wireless communication based on the detected volume in the wireless limiting state.

11. The communication controller according to claim 10, wherein the circuitry is further configured to cancel the wireless limiting state in a case where the recording of the concentrated voice in the recording medium ends.

12. The communication controller according to claim 1, wherein the circuitry is further configured to output a notification indicating the change of the wireless output of the first wireless communication.

13. A control method of a communication controller, comprising:
- executing first wireless communication based on a first wireless communication method, and second wireless communication based on a second wireless communication method;
- acquiring image data;
- detecting a volume of a voice;
- changing a wireless output of the first wireless communication based on the detected volume;
- transmitting, via the first wireless communication, the image data to an external device; and
- receiving, via the second wireless communication having a lower transfer rate than the first wireless communication, operation information from the external device.

14. A non-transitory computer-readable medium having stored thereon, computer-executable instructions which, when executed by a processor, cause the processor to execute operations, the operations comprising:
- executing first wireless communication based on a first wireless communication method, and second wireless communication based on a second wireless communication method;
- acquiring image data;
- detecting a volume of a voice;
- changing a wireless output of the first wireless communication based on the detected volume;
- transmitting, via the first wireless communication, the image data to an external device; and
- receiving, via the second wireless communication having a lower transfer rate than the first wireless communication, operation information from the external device.

* * * * *